United States Patent
Nakae et al.

(10) Patent No.: US 8,724,477 B2
(45) Date of Patent: May 13, 2014

(54) COMMUNICATION TERMINAL TRANMITTING OR RECEIVING A SIGNAL ACCORDING TO A SET TIMING DETERMINED BY A MAXIMUM OR MINIMUM VALUE OF A BACKOFF TIME AND CONTROL APPARATUS COMMUNICATION METHOD, COMPUTER PROGRAM AND INTEGRATED CIRCUIT PERFORMING THE SAME

(75) Inventors: Hironori Nakae, Osaka (JP); Yoichi Masuda, Osaka (JP)

(73) Assignee: Panasonic Corporation, Osaka (JP)

( * ) Notice: Subject to any disclaimer, the term of this patent is extended or adjusted under 35 U.S.C. 154(b) by 90 days.

(21) Appl. No.: 13/388,081

(22) PCT Filed: Jun. 1, 2011

(86) PCT No.: PCT/JP2011/003092
§ 371 (c)(1),
(2), (4) Date: Jan. 31, 2012

(87) PCT Pub. No.: WO2011/152050
PCT Pub. Date: Dec. 8, 2011

(65) Prior Publication Data
US 2012/0127865 A1 May 24, 2012

(30) Foreign Application Priority Data
Jun. 3, 2010 (JP) ................................. 2010-128353

(51) Int. Cl.
*G01R 31/08* (2006.01)
*G06F 11/00* (2006.01)
(52) U.S. Cl.
USPC ....................................................... 370/241

(58) Field of Classification Search
USPC ......................................................... 370/241
See application file for complete search history.

(56) References Cited

U.S. PATENT DOCUMENTS

| 5,903,843 | A | * | 5/1999 | Suzuki et al. | ............... | 455/452.2 |
| 2002/0082004 | A1 | * | 6/2002 | Sakai | ............................. | 455/423 |

(Continued)

FOREIGN PATENT DOCUMENTS

| JP | 2001-251668 | 9/2001 |
| JP | 2001-358615 | 12/2001 |

(Continued)

OTHER PUBLICATIONS

International Search Report issued Jul. 12, 2011 in International (PCT) Application No. PCT/JP2011/003092.

(Continued)

*Primary Examiner* — Mark Rinehart
*Assistant Examiner* — Maharishi Khirodhar
(74) *Attorney, Agent, or Firm* — Wenderoth, Lind & Ponack, L.L.P.

(57) ABSTRACT

A terminal includes a wireless transmission and reception unit that transmits or receives a signal using a frequency channel selected by switching between a plurality of frequency channels, and an interference detection unit that determines, for each of the plurality of frequency channels, whether or not interference occurs when transmitting or receiving the signal using the frequency channel. Further, the terminal includes a frequency channel priority control unit that sets a priority used when the wireless transmission and reception unit transmits or receives the signal, according to a result of the determination by the interference detection unit. The wireless transmission and reception unit transmits or receives the signal according to the priority.

10 Claims, 44 Drawing Sheets

(56) References Cited

U.S. PATENT DOCUMENTS

| | | | |
|---|---|---|---|
| 2005/0085190 A1 | 4/2005 | Nishikawa | |
| 2005/0088284 A1* | 4/2005 | Zai et al. | 340/10.2 |
| 2008/0013480 A1* | 1/2008 | Kapoor et al. | 370/328 |
| 2009/0304095 A1* | 12/2009 | Chauncey et al. | 375/260 |

FOREIGN PATENT DOCUMENTS

| JP | 2005-086408 | 3/2005 |
|---|---|---|
| JP | 2009-077224 | 4/2009 |

OTHER PUBLICATIONS

M. Morikura et al., "Revised Edition 802.11 High-speed Wireless LAN Textbook", Impress Net Business Company, Jan. 1, 2005, pp. 88, 132, 134, 135 (with partial English translation).

T. Hattori et al., "Revised Edition Wireless Broadband Textbook High-speed IP Wireless", Impress R&D, Jun. 21, 2006, pp. 103-104 (with partial English translation).

* cited by examiner

FIG. 17A

| Interference effect ||||||
|---|---|---|---|---|---|
| CH1 | CH2 | CH3 | CH4 | CH5 | Number of frequency channels with no interference detected |
| ○ | × | ○ | ○ | ○ | 4 |

○ No interference detected
× Interference detected

FIG. 17B

| Interference effect ||||||
|---|---|---|---|---|---|
| CH1 | CH2 | CH3 | CH4 | CH5 | Number of frequency channels with no interference detected |
| ○ | × | ○ | × | ○ | 3 |

○ No interference detected
× Interference detected

FIG. 17C

| Interference effect ||||||
|---|---|---|---|---|---|
| CH1 | CH2 | CH3 | CH4 | CH5 | Number of frequency channels with no interference detected |
| × | ○ | × | × | ○ | 2 |

○ No interference detected
× Interference detected

FIG. 17D

| Interference effect | | | | | |
|---|---|---|---|---|---|
| CH1 | CH2 | CH3 | CH4 | CH5 | Number of frequency channels with no interference detected |
| × | × | ○ | × | × | 1 |

○ No interference detected
× Interference detected

FIG. 18A

| Interference on frequency channel in current beacon interval | Backoff (number of slots) |
|---|---|
| NO | Set according to FIG. 18B |
| YES | 64 - 127 |

FIG. 18B

| Number of frequency channels with no interference | Backoff (number of slots) |
|---|---|
| 1 | 0 - 3 |
| 2 | 4 - 7 |
| 3 | 8 - 15 |
| 4 | 16 - 31 |
| 5 | 32 - 63 |

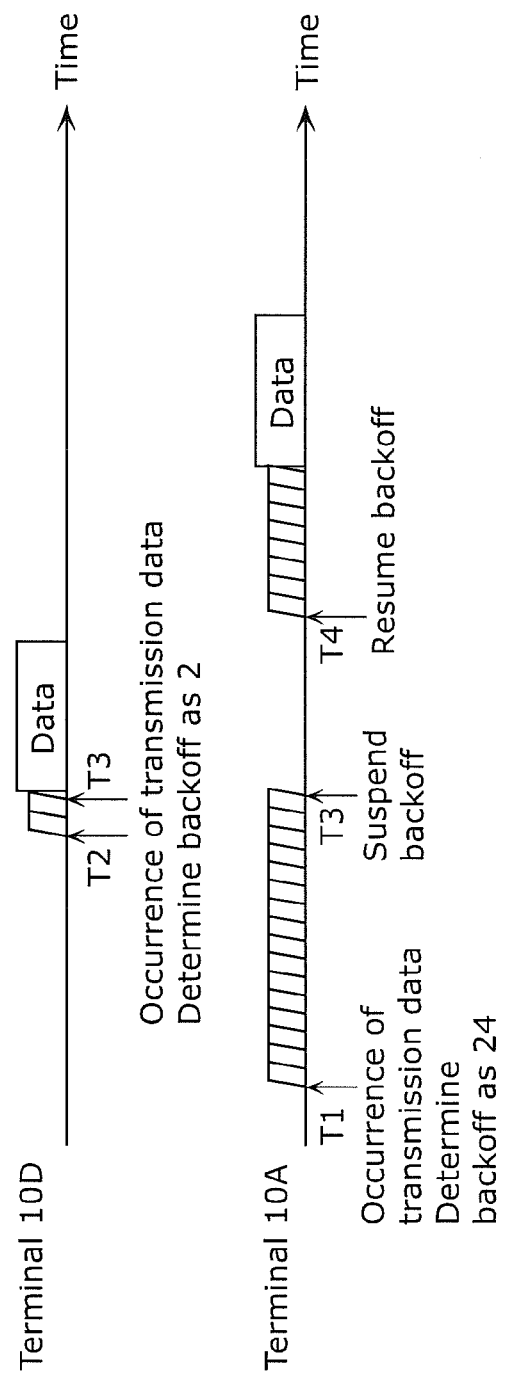

FIG. 21

| Number of frequency channels with interference detected | Backoff (number of slots) |
|---|---|
| 4 | 0 - 3 |
| 3 | 4 - 7 |
| 2 | 8 - 15 |
| 1 | 16 - 31 |
| 0 | 32 - 63 |

FIG. 22A

| Interference on frequency channel in current beacon interval | Backoff (number of slots) |
|---|---|
| NO | Set according to FIG. 22B |
| YES | 0 - 127 |

FIG. 22B

| Number of frequency channels with no interference | Backoff (number of slots) |
|---|---|
| 1 | 0 - 3 |
| 2 | 0 - 7 |
| 3 | 0 - 15 |
| 4 | 0 - 31 |
| 5 | 0 - 63 |

FIG. 23

| Number of frequency channels with no interference detected | Backoff (number of slots) |
|---|---|
| 1 | 0 - 3 |
| 2 | |
| 3 | |
| 4 | 4 - 7 |
| 5 | |

FIG. 24

$$(\text{Maximum backoff}) = 2^{(\text{Number of communicable frequency channels} + 1)} - 1$$

$$(\text{Minimum backoff}) \begin{cases} = 0 & \text{... Number of frequency channels with no interference detected} = 1 \\ = 2^{(\text{Number of communicable frequency channels})} & \text{... Number of frequency channels with no interference detected} \geq 2 \end{cases}$$

| Number of frequency channels with no interference detected | Data type | Backoff |
|---|---|---|
| 1 | High (voice) | 0 - 7 |
| | Low (background) | 8 - 15 |
| 2 | High (voice) | 16 - 23 |
| | Low (background) | 23 - 31 |
| 3 | High (voice) | 32 - 39 |
| | Low (background) | 40 - 47 |
| 4 | High (voice) | 48 - 55 |
| | Low (background) | 56 - 63 |

| Data type | Number of frequency channels with no interference detected | Backoff |
|---|---|---|
| High (voice) | 1 | 0 - 7 |
| | 2 | 8 - 15 |
| | 3 | 16 - 23 |
| | 4 | 23 - 31 |
| Low (background) | 1 | 32 - 39 |
| | 2 | 40 - 47 |
| | 3 | 48 - 55 |
| | 4 | 56 - 63 |

FIG. 34

| | Number of frequency channels with no interference detected | Transmission buffer for storing data |
|---|---|---|
| Transmission data | 1 | Buffer 41F |
| | 2 | Buffer 41G |
| | 3 | Buffer 41H |
| | 4 | Buffer 41I |
| | 5 | Buffer 41J |
| Beacon frame | Pass to frame processing unit 41B without temporarily storing in buffer | |

FIG. 37

|  | Interference effect |||||  |
|---|---|---|---|---|---|---|
|  | CH1 | CH2 | CH3 | CH4 | CH5 | Number of frequency channels with no interference detected |
| Terminal 30A | ○ | × | ○ | ○ | ○ | 4 |
| Terminal 30B | ○ | × | ○ | × | ○ | 3 |
| Terminal 30C | × | ○ | × | × | ○ | 2 |
| Terminal 30D | × | × | ○ | × | × | 1 |

○ No interference detected
× Interference detected

FIG. 38A

| Interference detected on frequency channel in current beacon interval at destination terminal | Maximum backoff (number of slots) | Backoff timer used |
|---|---|---|
| NO | Set according to FIG. 38B ||
| YES | 64 - 127 | Timer 43E |

FIG. 38B

| Number of frequency channels with no interference detected | Transmission buffer for storing data | Backoff | Backoff timer used |
|---|---|---|---|
| 1 | Buffer 41F | 0 - 3 | Timer 43F |
| 2 | Buffer 41G | 4 - 7 | Timer 43G |
| 3 | Buffer 41H | 8 - 15 | Timer 43H |
| 4 | Buffer 41I | 16 - 31 | Timer 43I |
| 5 | Buffer 41J | 32 - 63 | Timer 43J |

FIG. 44A

| Reception power [dBm] | Standard PHY rate | Error immunity |
|---|---|---|
| 10 or more | 50 kbps | Low ↑↓ High |
| 9 - 7 | 40 kbps | |
| 6 - 4 | 30 kbps | |
| 4 - 2 | 20 kbps | |
| 1 or less | 10 kbps | |

FIG. 44B

| Number of frequency channels with no interference detected | Transmission PHY rate |
|---|---|
| 1 | (Standard PHY rate - 40 kbps) |
| 2 | (Standard PHY rate - 30 kbps) |
| 3 | (Standard PHY rate - 20 kbps) |
| 4 | (Standard PHY rate - 10 kbps) |
| 5 | Standard PHY rate |

FIG. 49B

| Destination | Terminal 503 | Terminal 504 | Terminal 505 |
|---|---|---|---|
| Number of transmission packets | 100 packets | 1000 packets | 200 packets |

FIG. 49C

| Terminal 502 | Terminal 503 | | Terminal 504 | | Terminal 505 | |
|---|---|---|---|---|---|---|
| Channel | CH1 | CH2 | CH1 | CH2 | CH1 | CH2 |
| Interference level | 1 | 10 | 10 | 1 | 2 | 5 |

FIG. 49D

Interference level of frequency channel CH1 in terminal 502 = (1*100 + 10*1000 + 2*200) / (100 + 1000 + 200) = 8.08

Interference level of frequency channel CH2 in terminal 502 = (10*100 + 1*1000 + 5*200) / (100 + 1000 + 200) = 2.31

FIG. 50A

| IEEE802.11e access category | Backoff (number of slots) |
|---|---|
| Voice | Small (3 - 7) |
| Video | ↓ |
| Best effort | |
| Background | Large (15 - 31) |

FIG. 51A
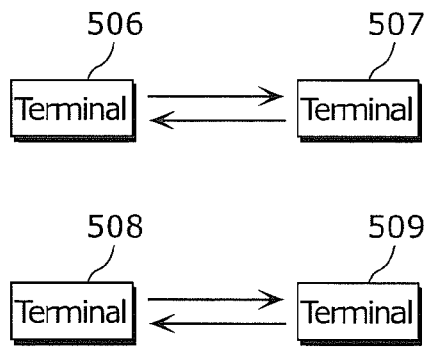
FIG. 51B
|  | Interference effect | | | | |
|---|---|---|---|---|---|
|  | CH1 | CH2 | CH3 | CH4 | CH5 |
| Scan result of terminal 506 | 1 | 2 | 3 | 4 | × |
| Scan result of terminal 508 | 1 | × | × | × | × |
1 - 4   Desired signal receivable level
      (number indicating priority)
×      Desired signal unreceivable level
FIG. 52A
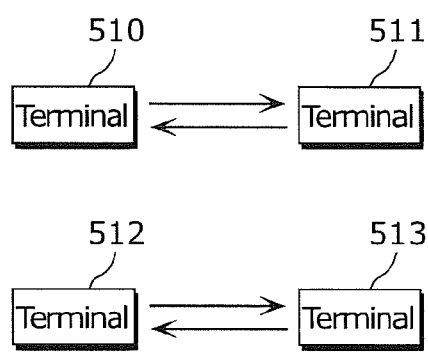

FIG. 52B

|  | Interference effect | |
|---|---|---|
|  | CH1 | CH2 |
| Interference level calculation result of terminal 510 | 2.76 | 5.65 |
| Interference level calculation result of terminal 512 | 3.79 | 3.85 |

COMMUNICATION TERMINAL TRANMITTING OR RECEIVING A SIGNAL ACCORDING TO A SET TIMING DETERMINED BY A MAXIMUM OR MINIMUM VALUE OF A BACKOFF TIME AND CONTROL APPARATUS COMMUNICATION METHOD, COMPUTER PROGRAM AND INTEGRATED CIRCUIT PERFORMING THE SAME

TECHNICAL FIELD

The present invention relates to a communication terminal that can avoid interference or collisions in communication using a plurality of frequency channels.

BACKGROUND ART

As a conventional communication terminal, there is proposed a technique in which a terminal that is to transmit data performs interference detection on each frequency channel and determines a frequency channel used for transmitting the data (for example, see Patent Literature (PTL) 1).

As another conventional communication terminal, there is also proposed a technique in which a terminal that is to transmit data compares interference levels and amounts of data transmitted to other terminals located within a communication range, and determines a frequency channel used for transmitting the data according to a comparison result (for example, see PTL 2).

As another conventional communication terminal, there is also proposed a technique in which a backoff time (hereafter also referred to as "backoff value") is controlled according to a type of data to be transmitted, thereby determining timing to transmit the data (for example, see Non Patent Literature (NPL) 1).

As another conventional communication terminal, there is also proposed a technique in which communication is performed using a hopping pattern generated by an adaptive frequency hopping function so as to exclude any channel that can lead to degradation in communication quality (for example, see NPL 2).

FIG. 48 is a diagram showing an example of frequency channel determination by the communication terminal described in PTL 1.

As shown in FIG. 48, a system includes terminals 500 and 501.

The terminal 500 determines a frequency channel for communicating with the terminal 501.

First, the terminal 500 scans all frequency channels, and measures received signal power to measure interference (Step S2101). It is assumed here that the number of frequency channels is five.

Next, the terminal 500 determines, from a scan result, frequency channels that enable desired signal reception, and sets priorities of the determined frequency channels in ascending order of undesired signal level (Step S2102).

It is assumed here that CH1 to CH4 are frequency channels that enable desired signal reception, where CH2, CH4, CH1, and CH3 are given descending priorities in this order.

The terminal 500 then transmits information of the priority order to the terminal 501, and switches to frequency channel CH2 of the highest priority (Step S2103).

Upon receiving the information of the priority order from the terminal 500, the terminal 501 switches to frequency channel CH2 of the highest priority (Step S2103).

The terminal 501 then transmits a test packet to the terminal 500, in order to check whether or not the terminal 501 is synchronized with the terminal 500 on frequency channel CH2 (Step S2104).

Upon receiving the test packet, the terminal 500 transmits a response to the terminal 501.

Upon receiving the response, the terminal 501 checks whether or not the terminal 501 is synchronized with the terminal 500, from information included in the response. It is assumed here that the terminal 501 is synchronized with the terminal 500.

Since the terminals 500 and 501 are synchronized with each other on frequency channel CH2, the terminals 500 and 501 establish a communication link on frequency channel CH2 and perform data communication (Step S2105).

In the case where the terminal 501 is not synchronized with the terminal 500 on frequency channel CH2, the terminal 501 transmits a test packet on frequency channel CH4 of the next highest priority, in order to check whether or not the terminal 501 is synchronized with the terminal 500 on frequency channel CH4.

As described above, in PTL 1, whether or not the terminals are synchronized with each other is checked in order of the frequency channels of descending priorities, and communication is performed using the channel on which the terminals are synchronized with each other, thereby avoiding interference or collisions.

FIGS. 49A to 49D are diagrams showing an example of frequency channel determination by the communication terminal described in PTL 2.

As shown in FIG. 49A, a system includes terminals 502, 503, 504, and 505 for transmitting and receiving data.

The terminal 502 determines a frequency channel used for communicating with the other terminals 503 to 505.

The terminal 502 stores the number of packets transmitted to each terminal in a predetermined period. FIG. 49B shows the number of packets transmitted from the terminal 502.

The terminal 502 also stores an interference level on each frequency channel. FIG. 49C shows an interference level of each terminal on each frequency channel, which is stored in the terminal 502.

The terminal 502 calculates a weighted-average interference level for each frequency channel using the information in FIGS. 49B and 49C. FIG. 49D shows a calculation result of the weighted-average interference level for each frequency channel. Here, frequency channel CH2 is lower in interference level than frequency channel CH1. Accordingly, the terminal 502 determines CH2 as the frequency channel used for communicating with the other terminals 503 to 505.

As described above, in PTL 2, the frequency channel used for communication is determined based on, as priority information, the amount of data transmitted to each terminal, thereby avoiding interference or collisions.

FIGS. 50A and 50B are diagrams showing an example of backoff control by the communication terminal described in NPL 1.

FIG. 50A shows an example of data types and backoff values in the IEEE (Institute of Electrical and Electronic Engineers) 802.11e standard. A higher priority corresponds to a smaller backoff value, contributing to a greater opportunity of data transmission.

FIG. 50B shows an example of backoff control on voice data which is higher in priority and background data which is lower in priority.

Suppose voice data and background data occur at time T1. The communication terminal randomly selects a value from 3 to 7 as a backoff value for the voice data, based on the information in FIG. 50A. It is assumed here that the value 4 is selected. The communication terminal also randomly selects a value from 15 to 31 as a backoff value for the background data, based on the information in FIG. 50A. It is assumed here that the value 19 is selected.

At time T2, the backoff of the voice data ends and the communication terminal transmits the voice data. Meanwhile, the backoff of the background data is suspended until time T3 at which a predetermined time elapses from when the transmission of the voice data ends.

At time T3, the communication terminal resumes the backoff of the background data.

As described above, in NPL 1, backoff control is performed according to the data type, thereby avoiding interference or collisions.

In NPL 2, an adaptive frequency hopping function is defined in order to avoid interference on a wireless LAN and the like using the same frequency band, in Bluetooth®. According to this function, a hopping pattern is generated from a plurality of provided frequency channels so as to exclude any channel that can lead to degradation in communication quality, and communication is performed using the generated hopping pattern. A control apparatus determines frequency channels used for communication, and notifies a terminal of the determined pattern.

As described above, in NPL 2, the control apparatus generates the hopping pattern from which any channel that can lead to degradation in communication quality is excluded and performs communication using the generated pattern, thereby avoiding interference or collisions.

CITATION LIST

Patent Literature

[PTL 1]
Japanese Unexamined Patent Application Publication No. 2009-77224
[PTL 2]
Japanese Unexamined Patent Application Publication No. 2005-86408

Non Patent Literature

[NPL 1]
Masahiro Morikura et al., Revised Edition 802.11 High-speed Wireless LAN Textbook, Impress, Jan. 1, 2005 (pp. 88, 132, 134, 135)
[NPL 2]
Takeshi Hattori and Masanobu Fujioka, Revised Edition Wireless Broadband Textbook High-speed IP Wireless, Impress, Jun. 21, 2006 (pp. 103, 104)

SUMMARY OF INVENTION

Technical Problem

However, the structures of the conventional communication terminals described in PTL 1 and PTL 2 fail to take into consideration which frequency channel is used for communication between other terminals, and therefore have a problem that there is a possibility of a decrease in throughput of the entire system. This problem is described in detail below.

FIGS. 51A and 51B are diagrams showing an example where the technique described in PTL 1 is applied to two pairs of terminals located within a communication range.

As shown in FIG. 51A, a system includes terminals 506, 507, 508, and 509 for transmitting and receiving data. FIG. 51B shows an example where the terminals 506 and 508 each determine frequency channels that enable desired signal reception from a scan result, and set priorities of the determined frequency channels in ascending order of undesired signal level. As shown in FIG. 51B, in the terminal 506, frequency channels that enable desired signal reception are CH1, CH2, CH3, and CH4 in descending order of reception level, while frequency channel CH5 does not enable desired signal reception. In the terminal 508, on the other hand, only frequency channel CH1 enables desired signal reception, and other frequency channels CH2 to CH5 do not enable desired signal reception.

The terminal 506 communicates with the terminal 507, and the terminal 508 communicates with the terminal 509, as shown in FIG. 51A.

First, the terminals 506 and 508 each perform scanning and generate the priority information as shown in FIG. 51B, and respectively transmit the priority information to the terminals 507 and 509.

Since frequency channel CH1 is highest in priority in both of the terminals 506 and 508 as a result of scanning, the terminals 506 and 508 each transmit a test packet on frequency channel CH1 to check whether or not the terminal is synchronized with its communication partner, i.e. the terminal in communication. In the case where both of the terminals 506 and 508 are synchronized with their respective communication partners on frequency channel CH1, the two communications are concentrated in frequency channel CH1. Hence, the technique described in PTL 1 has a problem that there is a possibility of a decrease in communication efficiency of the entire system.

FIGS. 52A and 52B are diagrams showing an example where the technique described in PTL 2 is applied to two pairs of terminals located within a communication range.

As shown in FIG. 52A, a system includes terminals 510, 511, 512, and 513 for transmitting and receiving data. FIG. 52B shows an interference level calculation result of the terminal 510 for each frequency channel used for communicating with the terminal 511 and an interference level calculation result of the terminal 512 for each frequency channel used for communicating with the terminal 513. For instance, in the terminal 510, the interference level on frequency channel CH1 is 2.76, and the interference level on frequency channel CH2 is 5.65.

The terminal 510 communicates with the terminal 511, and the terminal 512 communicates with the terminal 513, as shown in FIG. 52A.

First, the terminals 510 and 512 each calculate a weighted-average interference level of each frequency channel as shown in FIG. 52B, using the number of packets transmitted to the communication partner and the interference level of each frequency channel.

Since frequency channel CH1 is lowest in interference level in both of the terminals 510 and 512, the two communications are concentrated in frequency channel CH1. Hence, the technique described in PTL 2 has a problem that there is a possibility of a decrease in communication efficiency of the entire system.

In the conventional structure described in NPL 1, backoff control is performed according to the data type. Hence, the technique described in NPL 1 has a problem that there is a possibility of a data collision when a plurality of terminals transmit the same type of data.

In the conventional structure described in NPL 2, there is a possibility of a decrease in communication efficiency in the case where a frequency channel interference state in each terminal is taken into consideration.

In the case where the control apparatus generates the hopping pattern only in consideration of interference in the control apparatus, if there is a frequency channel that has no interference on the control apparatus side but has interference on the terminal side, communication quality decreases in a period during which this frequency channel is allocated on the terminal side, causing a waste of time.

In the case where the control apparatus receives interference information on the terminal side from the terminal and generates the hopping pattern, if the number of terminals is one, it is highly likely that there is a frequency channel without interference in both the control apparatus and the terminal. However, as the number of terminals increases, the possibility that there is no frequency channel without interference in all of the control apparatus and the terminals increases. Hence, the technique described in NPL 2 has a problem that there is a possibility of a decrease in communication efficiency of the entire system.

To solve the conventional problems stated above, the present invention has an object of providing a communication terminal that can improve communication efficiency in a wireless system in which communication is performed using a frequency channel selected by switching between a plurality of frequency channels.

Solution to Problem

A communication terminal according to one aspect of the present invention includes: a transmission and reception unit that transmits or receives a signal using a frequency channel selected by switching between a plurality of frequency channels; an interference detection unit that determines, for each of the plurality of frequency channels, whether or not interference occurs when transmitting or receiving the signal using the frequency channel; and a priority control unit that sets a priority used when the transmission and reception unit transmits or receives the signal, according to a result of the determination by the interference detection unit, wherein the transmission and reception unit transmits or receives the signal according to the priority.

According to this structure, the priority used when transmitting or receiving the signal can be changed according to the degree of interference. That is, transmission and reception control can be changed depending on whether the degree of interference is high or low. It is thus possible to provide a communication terminal that can improve communication efficiency in a wireless system in which communication is performed using a frequency channel selected by switching between a plurality of frequency channels.

Preferably, the priority indicates a maximum or minimum value of a backoff time, and the priority control unit sets the priority so that the maximum or minimum value of the backoff time is larger when the number of frequency channels on which no interference is detected by the interference detection unit is larger.

According to this structure, the backoff time is longer when the number of frequency channels on which no interference is detected is larger. In detail, the opportunity of communication on each frequency channel is decreased in the case where the number of frequency channels on which no interference is detected is larger, and increased in the case where the number of frequency channels on which no interference is detected is smaller. This allows each terminal to be equally provided with the communication opportunity. As a result, communication efficiency can be improved.

Moreover, the priority may indicate a PHY rate in data transmission, wherein the priority control unit sets the priority so that the PHY rate is lower when the number of frequency channels on which no interference is detected by the interference detection unit is smaller.

According to this structure, the PHY (physical layer) rate is lower when the number of frequency channels on which no interference is detected is smaller. A lower PHY rate contributes to higher immunity from errors, which leads to higher transmission robustness. Thus, a communication terminal with a smaller number of frequency channels on which no interference is detected is increased in transmission robustness, with it being possible to enhance transmission reliability. As a result, communication efficiency can be improved.

Moreover, the priority may indicate an opportunity of communicating by time division multiple access in an access interval in each beacon interval, wherein the priority control unit sets the priority so that the opportunity of communicating by time division multiple access is greater when the number of frequency channels on which no interference is detected by the interference detection unit is smaller.

According to this structure, the priority is set so that the opportunity of communicating by time division multiple access is greater when the number of frequency channels on which no interference is detected is smaller. In detail, the opportunity of communication on each frequency channel is decreased in the case where the number of frequency channels on which no interference is detected is larger, and increased in the case where the number of frequency channels on which no interference is detected is smaller. This allows each terminal to be equally provided with the communication opportunity. As a result, communication efficiency can be improved.

A control apparatus according to another aspect of the present invention includes: a transmission and reception unit that transmits or receives a signal using a frequency channel selected by switching between a plurality of frequency channels; an interference information analysis unit that, for each terminal in communication with the control apparatus, analyzes information received from the terminal to determine, for each of the plurality of frequency channels, whether or not interference occurs at the terminal when transmitting or receiving the signal using the frequency channel, the information indicating, for each of the plurality of frequency channels, whether or not interference occurs at the terminal when transmitting or receiving the signal using the frequency channel; and a priority control unit that sets a priority used when the transmission and reception unit transmits or receives the signal, according to a result of the determination by the interference information analysis unit, wherein the transmission and reception unit transmits or receives the signal according to the priority.

According to this structure, the priority used when transmitting or receiving the signal can be changed according to the degree of interference. That is, transmission and reception control can be changed depending on whether the degree of interference is high or low. It is thus possible to provide a control apparatus that can improve communication efficiency in a wireless system in which communication is performed using a frequency channel selected by switching between a plurality of frequency channels.

Note that the present invention can be realized not only as a communication terminal and a control apparatus including these characteristic processing units, but also as a communication method including steps of processing executed by the characteristic processing units included in the communication terminal or the control apparatus. The present invention can also be realized as a program causing a computer to execute the characteristic steps included in the communication method. Such a program may be distributed via a computer-readable nonvolatile recording medium such as a CD-ROM (Compact Disc-Read Only Memory) or a communication network such as the Internet.

Advantageous Effects of Invention

According to the present invention, it is possible to provide a communication terminal that can improve communication efficiency in a wireless system in which communication is performed using a frequency channel selected by switching between a plurality of frequency channels.

BRIEF DESCRIPTION OF DRAWINGS

FIG. 17A is a diagram showing an example of an interference table stored in an interference management unit in the terminal according to Embodiment 1 of the present invention.

FIG. 17B is a diagram showing the example of the interference table stored in the interference management unit in the terminal according to Embodiment 1 of the present invention.

FIG. 17C is a diagram showing the example of the interference table stored in the interference management unit in the terminal according to Embodiment 1 of the present invention.

FIG. 17D is a diagram showing the example of the interference table stored in the interference management unit in the terminal according to Embodiment 1 of the present invention.

FIG. 18A is a diagram showing an example of a backoff table stored in an interference frequency channel number and backoff management unit in the terminal according to Embodiment 1 of the present invention.

FIG. 18B is a diagram showing the example of the backoff table stored in the interference frequency channel number and backoff management unit in the terminal according to Embodiment 1 of the present invention.

FIG. 19 is a diagram showing an example of backoff control according to Embodiment 1 of the present invention.

FIG. 21 is a diagram showing another example of the backoff table stored in the interference frequency channel number and backoff management unit in the terminal according to Embodiment 1 of the present invention.

FIG. 22A is a diagram showing another example of the backoff table stored in the interference frequency channel number and backoff management unit in the terminal according to Embodiment 1 of the present invention.

FIG. 22B is a diagram showing another example of the backoff table stored in the interference frequency channel number and backoff management unit in the terminal according to Embodiment 1 of the present invention.

FIG. 23 is a diagram showing another example of the backoff table stored in the interference frequency channel number and backoff management unit in the terminal according to Embodiment 1 of the present invention.

FIG. 24 is a diagram showing backoff calculation expressions stored in the interference frequency channel number and backoff management unit in the terminal according to Embodiment 1 of the present invention.

FIG. 34 is a diagram showing an example of a classification table stored in a classification unit in the control apparatus according to Embodiment 2 of the present invention.

FIG. 37 is a diagram showing an example of an interference table stored in an interference management unit in the control apparatus according to Embodiment 2 of the present invention.

FIG. 38A is a diagram showing an example of a backoff table stored in an interference frequency channel number and backoff management unit in the control apparatus according to Embodiment 2 of the present invention.

FIG. 38B is a diagram showing the example of the backoff table stored in the interference frequency channel number and backoff management unit in the control apparatus according to Embodiment 2 of the present invention.

FIG. 44A is a diagram showing an example of a PHY rate table stored in the frequency channel priority control unit in the terminal according to the present invention.

FIG. 44B is a diagram showing the example of the PHY rate table stored in the frequency channel priority control unit in the terminal according to the present invention.

FIG. 49B is a diagram showing the example of frequency channel determination of the terminal in PTL 2.

FIG. 49C is a diagram showing the example of frequency channel determination of the terminal in PTL 2.

FIG. 49D is a diagram showing the example of frequency channel determination of the terminal in PTL 2.

FIG. 50A is a diagram showing an example of backoff control of a terminal in NPL 1.

FIG. 51A is a diagram showing an example of frequency channel determination of two pairs of terminals located within a communication range in PTL 1.

FIG. 51B is a diagram showing the example of frequency channel determination of the two pairs of terminals located within the communication range in PTL 1.

FIG. 52A is a diagram showing an example of frequency channel determination of two pairs of terminals located within a communication range in PTL 2.

FIG. 52B is a diagram showing the example of frequency channel determination of the two pairs of terminals located within the communication range in PTL 2.

DESCRIPTION OF EMBODIMENTS

The following describes embodiments of the present invention with reference to drawings.

Embodiment 1

Figure 1:
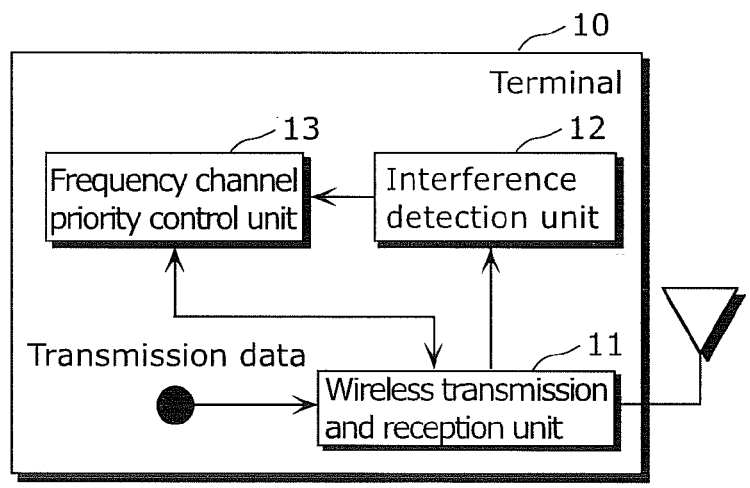
FIG. 1 is a block diagram showing a structure of a terminal according to Embodiment 1 of the present invention.

FIG. 1 is a functional block diagram showing a structure of a terminal according to Embodiment 1 of the present invention.

A terminal 10 includes a wireless transmission and reception unit 11, an interference detection unit 12, and a frequency channel priority control unit 13.

The wireless transmission and reception unit 11 transmits or receives a signal using a frequency channel selected from a plurality of frequency channels, according to a priority described later. The interference detection unit 12 determines, for each frequency channel, whether or not interference occurs when transmitting or receiving the signal using the frequency channel. The frequency channel priority control unit 13 changes the priority used when the wireless transmission and reception unit 11 transmits or receives the signal, according to a result of the determination by the interference detection unit 12.

Figure 2:
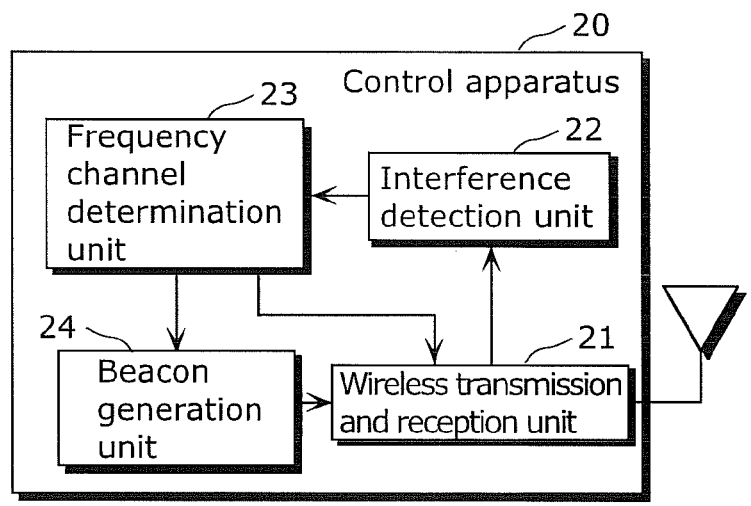
FIG. 2 is a block diagram showing a structure of a control apparatus according to Embodiment 1 of the present invention.

FIG. 2 is a functional block diagram showing a structure of a control apparatus according to Embodiment 1 of the present invention.

A control apparatus 20 includes a wireless transmission and reception unit 21, an interference detection unit 22, a frequency channel determination unit 23, and a beacon generation unit 24.

The wireless transmission and reception unit 21 transmits or receives a signal using a frequency channel selected from the plurality of frequency channels. The interference detection unit 22 determines, for each frequency channel, whether or not interference occurs. The frequency channel determination unit 23 determines the frequency channel used when the wireless transmission and reception unit 21 transmits or receives the signal, according to a result of the determination by the interference detection unit 22. The beacon generation unit 24 generates a beacon frame that is subject to periodical transmission and reception, the beacon frame including information of the frequency channel that is determined by the frequency channel determination unit 23 to be used for transmitting or receiving the signal.

Figure 3:
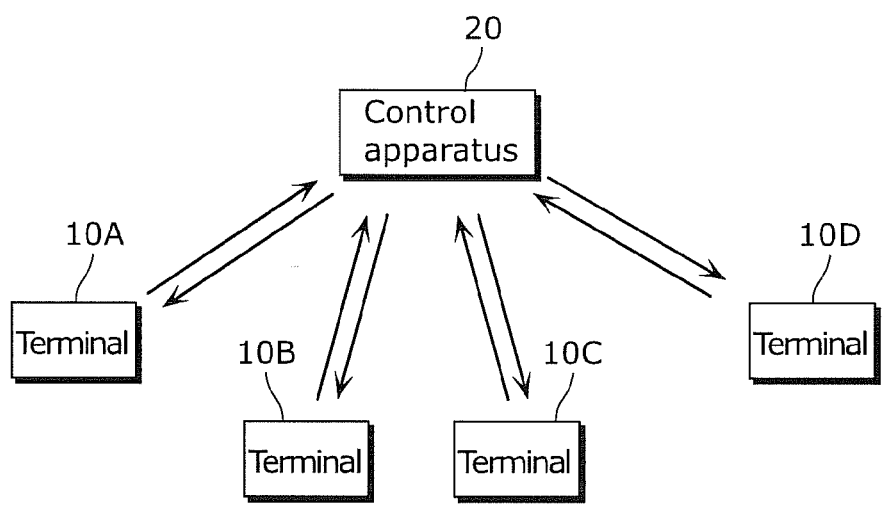
FIG. 3 is a diagram showing a structure of a wireless system according to the present invention.

FIG. 3 is a network diagram showing an example of a wireless communication system according to Embodiment 1 of the present invention. In FIG. 3, the wireless communication system includes the control apparatus 20 for controlling a wireless network, and terminals 10A to 10D each of which has the functions of the terminal 10 and performs wireless communication with the control apparatus 20 under control of the control apparatus 20.

The control apparatus 20 periodically transmits the beacon frame including control information of the wireless network, in order to control the wireless network.

Figure 4:
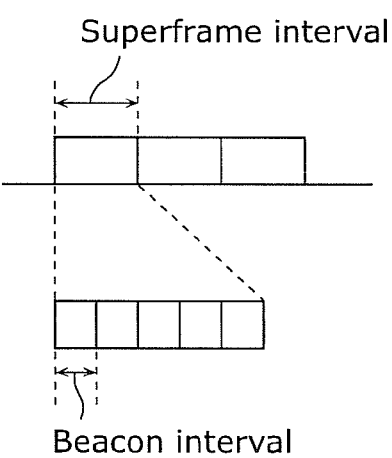
FIG. 4 is a schematic diagram showing a structure of a superframe according to the present invention.

FIG. 4 is a schematic diagram showing intervals of transmitting the beacon frame in time sequence. A largest interval is a superframe interval. The superframe interval is divided into beacon intervals in units of which the control apparatus 20 transmits the beacon frame. In FIG. 4, five beacon intervals are provided in one superframe interval. The structure of the superframe interval is shown in time sequence in FIG. 4. The control apparatus 20 and the terminals 10A to 10D are capable of performing wireless communication while switching between the plurality of frequency channels, and perform communication while switching between the plurality of frequency channels in units of beacon intervals. The superframe interval mentioned here is an interval from transmission of one beacon frame to transmission of the next beacon frame on the same frequency channel. In other words, the superframe interval is one cycle of a frequency hopping pattern.

Figure 5:
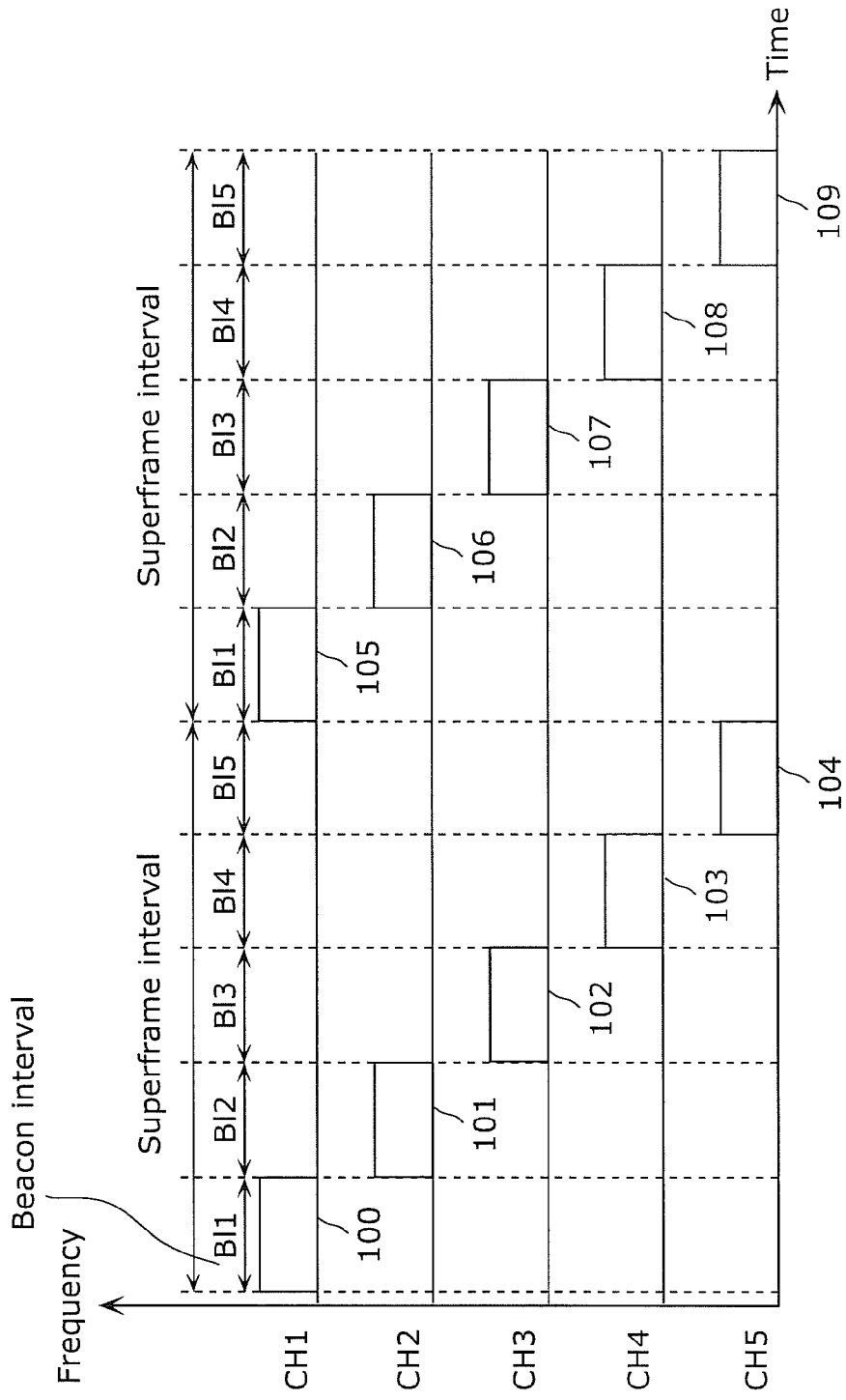
FIG. 5 is a schematic diagram showing beacon intervals and an arrangement of frequency channels according to the present invention.

FIG. 5 is a schematic diagram showing channel arrangement in beacon intervals in the case of switching between the plurality of frequency channels in units of beacon intervals.

In FIG. 5, the control apparatus 20 allocates frequency channel CH1 to beacon interval BI1 in a superframe interval to set a wireless communication interval 100. Likewise, the control apparatus 20 allocates frequency channel CH2 to beacon interval BI2 to set a wireless communication interval 101, allocates frequency channel CH3 to beacon interval BI3 to set a wireless communication interval 102, allocates frequency channel CH4 to beacon interval BI4 to set a wireless communication interval 103, and allocates frequency channel CH5 to beacon interval BI5 to set a wireless communication interval 104.

When the superframe interval ends and the next superframe interval begins, the control apparatus 20 again allocates frequency channel CH1 to beacon interval BI1 to set a wireless communication interval 105, and allocates frequency channel CH2 to beacon interval BI2 to set a wireless communication interval 106. The control apparatus 20 repeats the same frequency channel allocation for each superframe interval.

Figure 6:
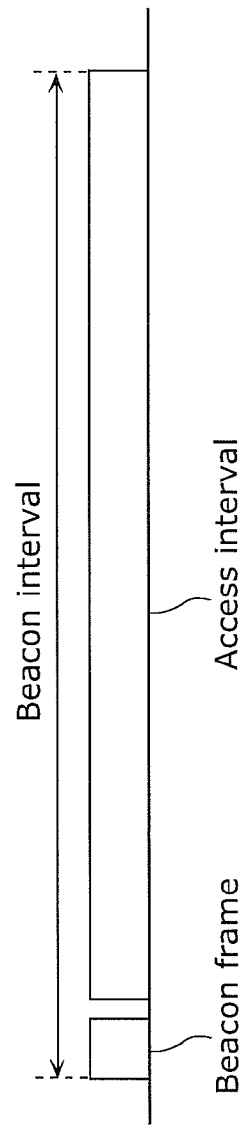
FIG. 6 is a schematic diagram showing an arrangement of a beacon interval according to the present invention.

FIG. 6 is a schematic diagram showing a structure of a beacon interval. In the beacon interval, the control apparatus 20 first transmits a beacon frame including control information of the wireless network. This is followed by an access interval in the beacon interval. Each wireless terminal including the control apparatus 20 is allowed to perform wireless communication in this access interval. The following description is based on an assumption that each wireless terminal performs wireless communication by CSMA (Carrier Sense Multiple Access) in the access interval. Note that the present invention is not limited to the wireless access method of CSMA, and other wireless access methods such as ALOHA and TDMA (Time Division Multiple Access) are also applicable.

In FIG. 5, for example, in the case where the terminal 10A communicates using frequency channel CH1, the terminal 10A operates only in beacon interval BI1. That is, the terminal 10A communicates by CSMA during the access interval in the wireless communication interval 100 and then during the access interval in the wireless communication interval 105, without performing wireless communication in an interval (the wireless communication intervals 102 to 104) between the wireless communication intervals 100 and 105. This enables the terminal 10A to minimize power consumption of the functional blocks necessary for wireless communication, as in an inactive interval.

Figure 7:
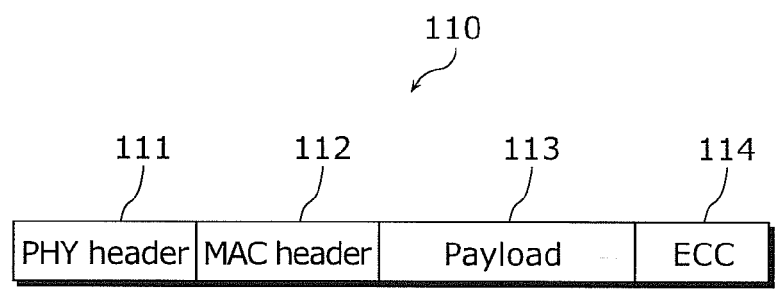
FIG. 7 is a schematic diagram showing a wireless frame format according to the present invention.

FIG. 7 is a diagram showing a format of a wireless frame transmitted by each wireless terminal in the access interval. A wireless frame 110 is composed of a PHY header 111, a MAC header 112, a payload 113, and an ECC (Error-Correcting Code) 114.

The PHY header 111 is composed of codes necessary for demodulating a wireless signal, such as a bit synchronization code and a frame synchronization code. The MAC header 112 is composed of a frame type and address information. The payload 113 is information transmitted to the communication partner. The ECC 114 is a code for detecting whether or not the wireless frame 110 is successfully transmitted.

Figure 8:
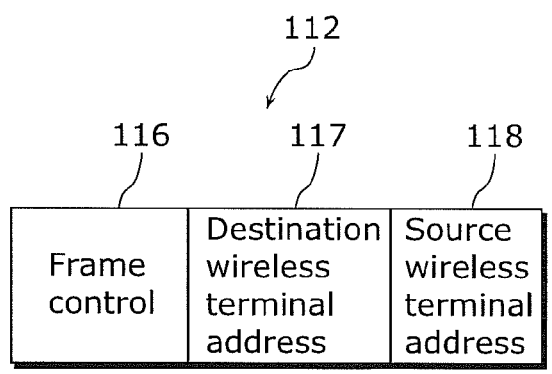
FIG. 8 is a schematic diagram showing a MAC header format according to Embodiment 1 of the present invention.

In detail, the MAC header 112 includes frame control 116 indicating a frame type and the like, a destination wireless terminal address 117, and a source wireless terminal address 118, as shown in FIG. 8. Examples of the frame type include a data frame for transmitting and receiving data between wireless terminals, an ACK frame for acknowledging that a data frame or the like is successfully received, a beacon frame for transmitting control information from the control apparatus 20 to the terminal 10 within the wireless network, and so on.

The following describes a method of performing wireless communication between the control apparatus 20 and the terminals 10A to 10D in the wireless network of the above-mentioned structure.

Figure 9:
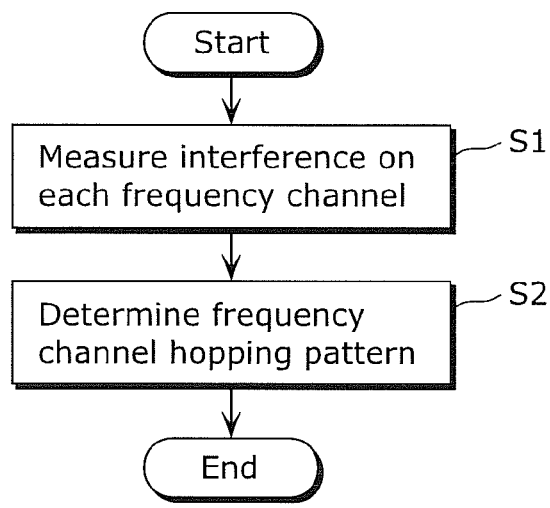
FIG. 9 is a diagram showing an example of an initial process flow of the control apparatus according to Embodiment 1 of the present invention.

FIG. 9 shows an example of an initial process flow of the control apparatus 20.

When activated, the control apparatus 20 first measures interference on each frequency channel (Step S1).

In detail, the wireless transmission and reception unit 21 in the control apparatus 20 scans frequency channels CH1 to CH5 for a predetermined time. The wireless transmission and reception unit 21 passes a received signal to the interference detection unit 22.

The interference detection unit 22 performs interference detection. Here, the interference detection unit 22 determines, for each frequency channel, whether or not the frequency channel is available, by checking the presence or absence of interference effect through power measurement or the like. It is assumed here that the interference detection unit 22 determines that there is no interference on frequency channels CH1 to CH5.

Following this, the frequency channel determination unit 23 in the control apparatus 20 determines frequency channels in beacon intervals within a superframe interval, using a result of the determination by the interference detection unit 22 (Step S2).

It is assumed here that, since there is no interference on frequency channels CH1 to CH5, a superframe is formed with the channel arrangement shown in FIG. 5.

Figure 10:
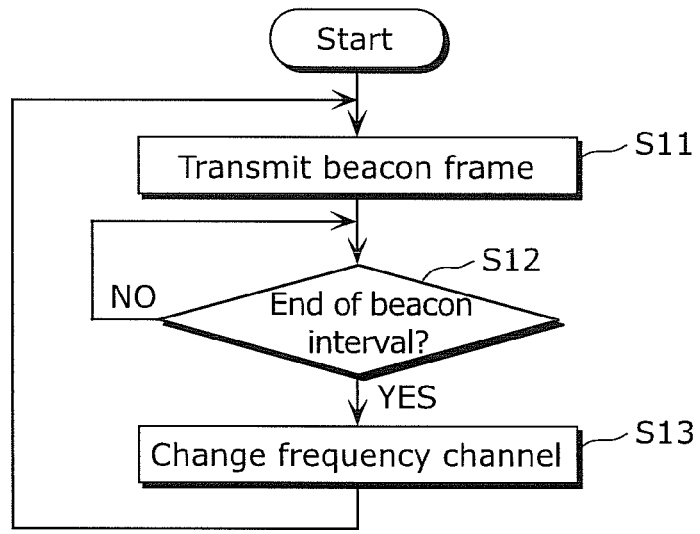
FIG. 10 is a diagram showing an example of a beacon interval switching process flow of the control apparatus according to Embodiment 1 of the present invention.

FIG. 10 shows an example of a beacon interval switching process flow of the control apparatus 20.

After the initial process ends, the frequency channel determination unit 23 in the control apparatus 20 passes the determined frequency channel information to the wireless transmission and reception unit 21 and the beacon generation unit 24.

Upon receiving the frequency channel information from the frequency channel determination unit 23, the wireless transmission and reception unit 21 switches the frequency channel to frequency channel CH1 in the first beacon interval in the superframe interval.

After the wireless transmission and reception unit 21 switches the frequency channel, the beacon generation unit 24 generates a beacon frame including the frequency channel information received from the frequency channel determination unit 23 beforehand, and transmits the generated beacon frame to the wireless network via the wireless transmission and reception unit 21 (Step S11).

The wireless transmission and reception unit 21 then performs data transmission or reception using frequency channel CH1, until the beacon interval ends (Step S12: NO).

After the beacon interval ends, the wireless transmission and reception unit 21 switches to frequency channel CH2 in the next beacon interval (Step S13).

After the wireless transmission and reception unit 21 switches the frequency channel, the beacon generation unit 24 generates a beacon frame including the frequency channel information received from the frequency channel determination unit 23 beforehand, and transmits the generated beacon frame to the wireless network via the wireless transmission and reception unit 21 (Step S11).

Figure 11:
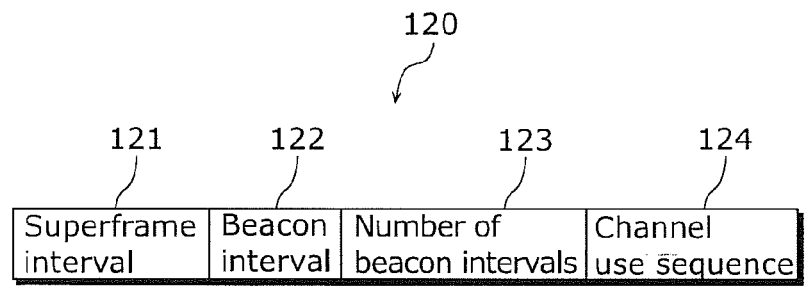
FIG. 11 is a schematic diagram showing a payload of a beacon frame according to the present invention.

FIG. 11 shows a format of a payload of a beacon frame.

A payload 120 in the beacon frame includes a superframe interval 121, a beacon interval 122, a number of beacon intervals 123, and a channel use sequence 124. The superframe interval 121 and the beacon interval 122 are information for specifying the superframe interval and the beacon interval shown in FIGS. 4 and 5.

Figure 12:
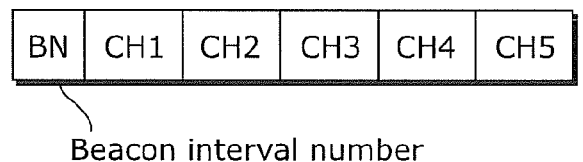
FIG. 12 is a schematic diagram showing a channel use sequence in the payload of the beacon frame according to the present invention.

FIG. 12 is a diagram showing an example of a structure of the channel use sequence 124. A beacon interval number BN is located first in the channel use sequence 124, followed by the frequency channels used on the beacon interval basis in sequence. In the example shown in FIG. 12, the number of beacon intervals is five, and the frequency channels are used in order of CH1, CH2, CH3, CH4, and CH5. In the case where the beacon interval number BN is 1, the frequency channel used in the current beacon interval is CH1. This means that the frequency channel used in the next beacon interval is CH2 and the frequency channel used in the beacon interval following the next beacon interval is CH3. Likewise, in the case where the beacon interval number BN is 2, the frequency channel used in the current beacon interval is CH2. This means that the frequency channel used in the next beacon interval is CH3 and the frequency channel used in the beacon interval following the next beacon interval is CH4.

Figure 13:
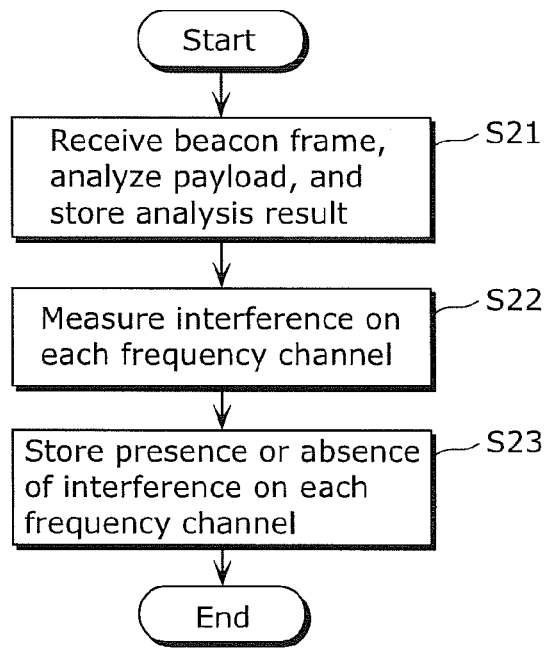
FIG. 13 is a diagram showing an example of an initial process flow of the terminal according to Embodiment 1 of the present invention.

FIG. 13 shows an example of an initial process flow of the terminal 10.

When activated, the terminal 10 first starts scanning a beacon frame. Upon receiving the beacon frame, the terminal 10 analyzes a payload of the beacon frame, and stores an analysis result (Step S21).

The terminal 10 then measures interference on each frequency channel (Step S22).

The wireless transmission and reception unit 11 in the terminal 10 scans frequency channels CH1 to CH5 for a predetermined time. The wireless transmission and reception unit 11 passes a received signal to the interference detection unit 12.

The interference detection unit 12 performs interference detection. Here, the interference detection unit 12 determines, for each frequency channel, whether or not the frequency channel is available, by checking the presence or absence of interference effect through power measurement or the like.

The frequency channel priority control unit 13 in the terminal 10 stores a result of the determination by the interference detection unit 12 (Step S23).

Figure 14:
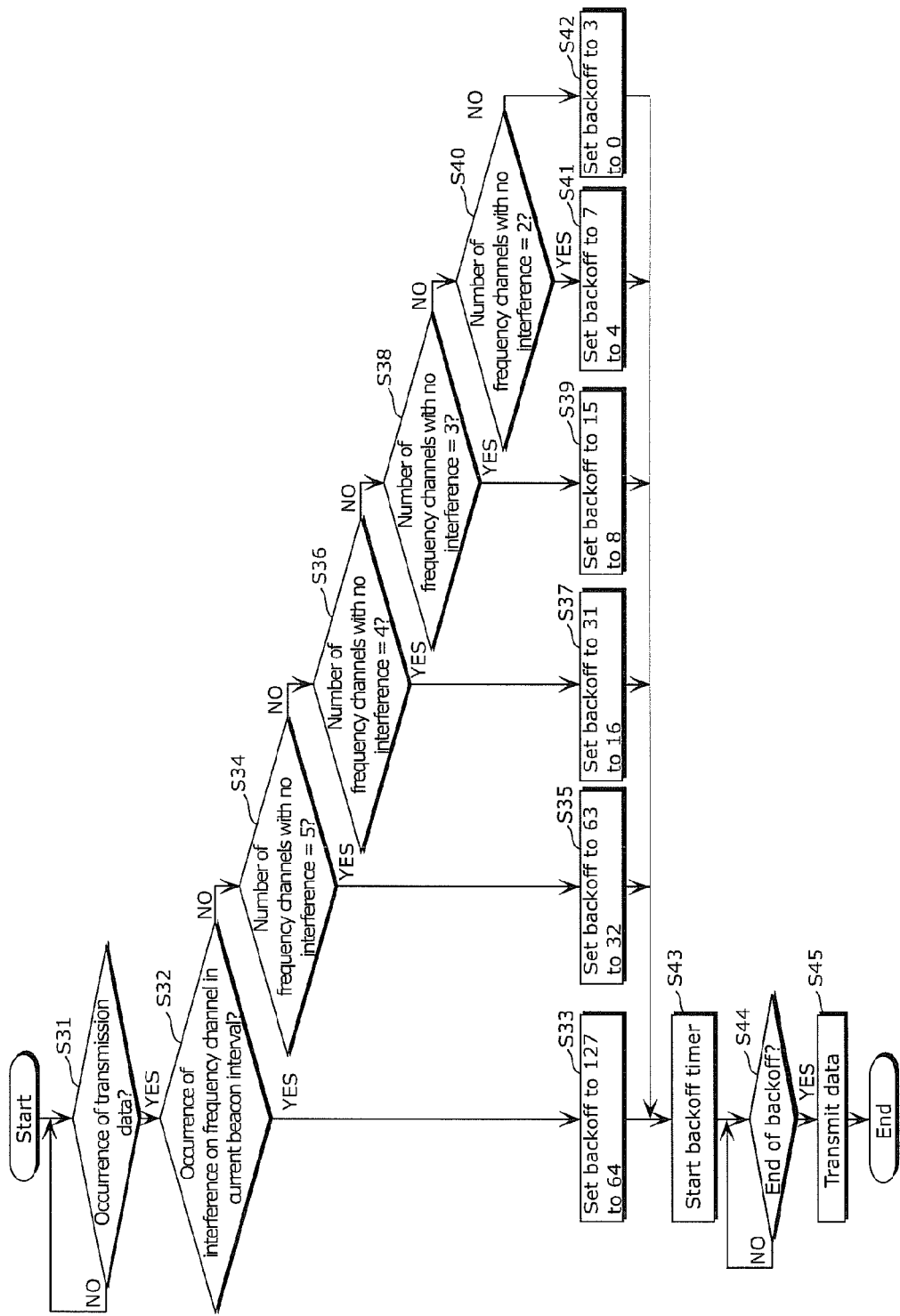
FIG. 14 is a diagram showing an example of a data transmission process flow of the terminal according to Embodiment 1 of the present invention.

FIG. 14 shows an example of a data transmission process flow of the terminal 10.

When receiving transmission data from an upper layer not shown, the terminal 10 feeds the transmission data to the wireless transmission and reception unit 11 (Step S31: YES).

Upon detecting the data fed to the wireless transmission and reception unit 11, the frequency channel priority control unit 13 checks whether or not interference occurs on the frequency channel in the current beacon interval. Here, the check is performed using the interference determination result stored in the initial process (Step S32).

In the case of determining that interference occurs on the current frequency channel (Step S32: YES), the frequency channel priority control unit 13 randomly sets the backoff value to a value from 127 to 64 (Step S33).

In the case of determining that no interference occurs on the current frequency channel (Step S32: NO), the frequency channel priority control unit 13 checks the number of frequency channels with no interference, using the interference determination result stored in the initial process. It is assumed here that a total of five frequency channels, i.e. CH1 to CH5, are supported in this system.

In the case where the number of frequency channels with no interference is five (Step S34: YES), the frequency channel priority control unit 13 randomly sets the backoff value to a value from 63 to 32 (Step S35).

In the case where the number of frequency channels with no interference is four (Step S36: YES), the frequency channel priority control unit 13 randomly sets the backoff value to a value from 31 to 16 (Step S37).

In the case where the number of frequency channels with no interference is three (Step S38: YES), the frequency channel priority control unit 13 randomly sets the backoff value to a value from 15 to 8 (Step S39).

In the case where the number of frequency channels with no interference is two (Step S40: YES), the frequency channel priority control unit 13 randomly sets the backoff value to a value from 7 to 4 (Step S41).

In the case where the number of frequency channels with no interference is one (Step S40: NO), the frequency channel priority control unit 13 randomly sets the backoff value to a value from 3 to 0 (Step S42).

The frequency channel priority control unit 13 then starts a backoff timer with the set backoff value (Step S43).

When the operation of the backoff timer ends, the frequency channel priority control unit 13 notifies the wireless transmission and reception unit 11 of the end of the backoff timer (Step S44: YES).

When notified of the end of the backoff timer, the wireless transmission and reception unit 11 transmits the transmission data (Step S45).

Thus, in this embodiment, the priority used when the wireless transmission and reception unit 11 transmits or receives the signal indicates a maximum or minimum value of a backoff time (backoff value). The backoff time mentioned here is a wait time from when a frequency channel to be used becomes available to enable communication to when transmission is started. Note, however, that the backoff time is not limited to this. For example, in the case of employing such a wireless access method that allocates a communication interval to each group of a plurality of terminals, the backoff time may be a wait time from the start of the communication interval to the start of the transmission.

Moreover, the frequency channel priority control unit 13 sets the priority so that the maximum or minimum value of the backoff time is larger when the number of frequency channels on which no interference is detected by the interference detection unit 12 is larger.

Here, the maximum or minimum value of the backoff time is larger in the case of transmitting or receiving the signal using a frequency channel on which interference is detected by the interference detection unit 12, than in the case of transmitting or receiving the signal using a frequency channel on which no interference is detected by the interference detection unit 12.

Preferably, a minimum value of the backoff time in the case of transmitting or receiving the signal using a frequency channel on which interference is detected by the interference detection unit 12 is larger than a maximum value of the backoff time in the case of transmitting or receiving the signal using a frequency channel on which no interference is detected by the interference detection unit 12.

Figure 15:
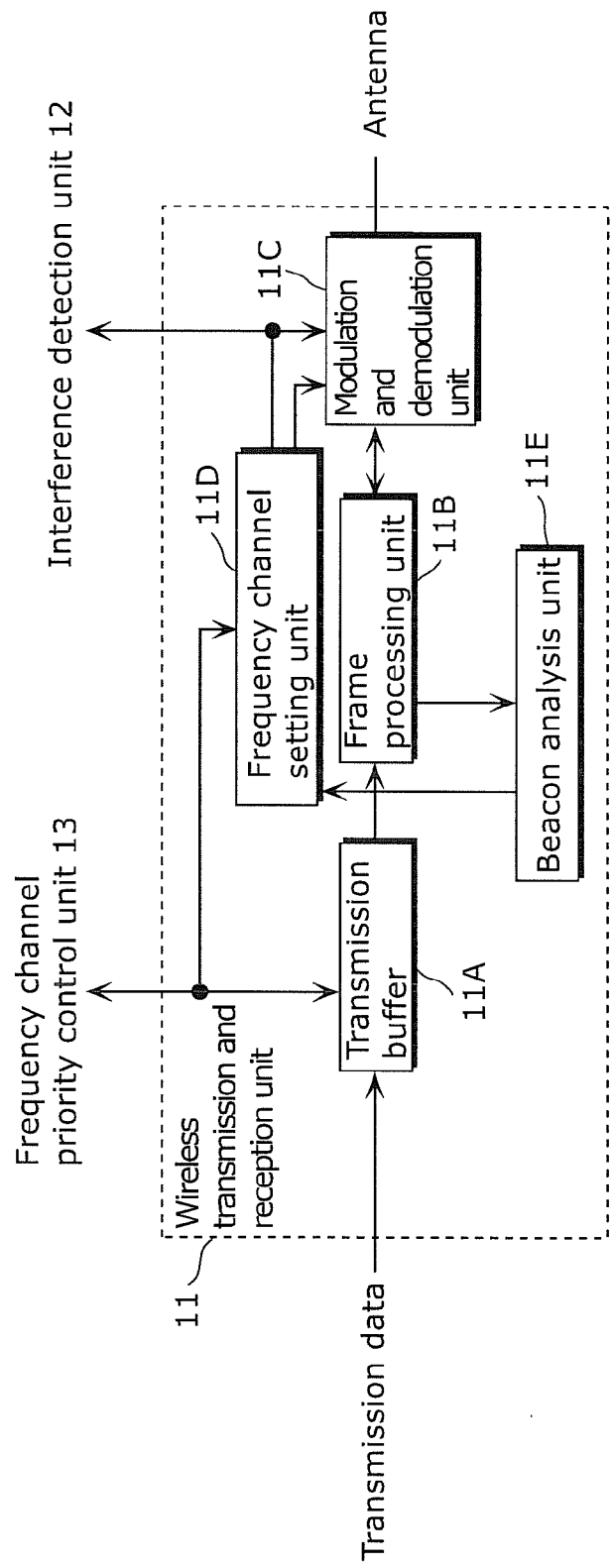
FIG. 15 is a block diagram showing an internal structure of a wireless transmission and reception unit in the terminal according to Embodiment 1 of the present invention.

FIG. 15 is a block diagram showing an internal structure of the wireless transmission and reception unit 11 in the terminal 10.

The wireless transmission and reception unit 11 includes a transmission buffer 11A, a frame processing unit 11B, a modulation and demodulation unit 11C, a frequency channel setting unit 11D, and a beacon analysis unit 11E.

The transmission buffer 11A temporarily stores transmission data. The frame processing unit 11B sets wireless header information and the like, in the transmission data outputted from the transmission buffer 11A. The modulation and demodulation unit 11C performs demodulation of a frame inputted from an antenna and modulation of a frame outputted to the wireless network, in a set frequency channel. The frequency channel setting unit 11D sets a frequency channel used when the modulation and demodulation unit 11C transmits or receives a frame. The beacon analysis unit 11E analyzes a payload of a beacon frame received from the control apparatus 20.

Figure 16:
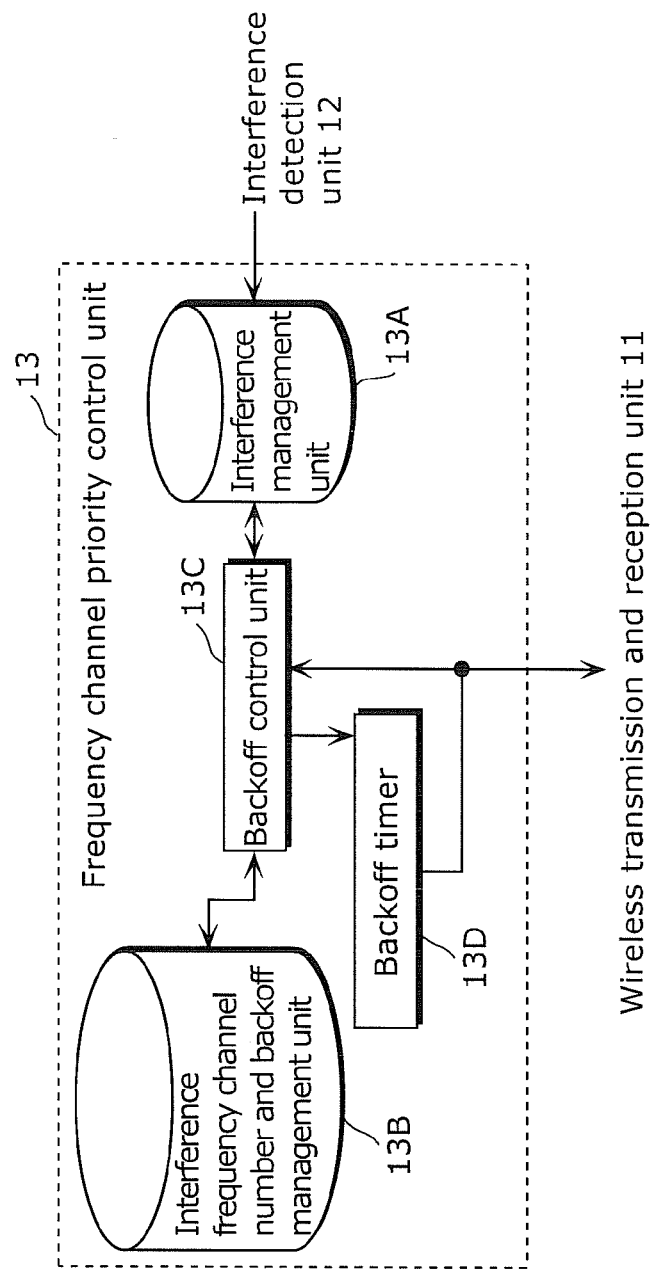
FIG. 16 is a block diagram showing an internal structure of a frequency channel priority control unit in the terminal according to Embodiment 1 of the present invention.

FIG. 16 is a block diagram showing an internal structure of the frequency channel priority control unit 13 in the terminal 10.

The frequency channel priority control unit 13 includes an interference management unit 13A, an interference frequency channel number and backoff management unit 13B, a backoff control unit 13C, and a backoff timer 13D.

The interference management unit 13A stores the presence or absence of interference for each of frequency channels CH1 to CH5 notified from the interference detection unit 12. The interference frequency channel number and backoff management unit 13B manages the number of frequency channels on which no interference is detected by the interference detection unit 12 and the backoff time which is a wait time to the start of transmission of transmission data, in association with each other. The backoff control unit 13C determines the backoff time of the transmission data, using the information in the interference management unit 13A and the interference frequency channel number and backoff management unit 13B. The backoff timer 13D is a timer that operates with the value set by the backoff control unit 13C.

FIGS. 17A to 17D show examples of an interference table indicating the presence or absence of interference for each of frequency channels CH1 to CH5 stored in the interference management unit 13A.

Information indicating the presence or absence of interference on each frequency channel and the number of frequency channels with no interference are included in the interference table.

FIG. 17A shows an example of an interference table stored in the interference management unit 13A in the terminal 10A shown in FIG. 3.

In the terminal 10A, interference occurs on frequency channel CH2, so that the interference table as shown in FIG. 17A is stored in the interference management unit 13A.

FIG. 17B shows an example of an interference table stored in the interference management unit 13A in the terminal 10B shown in FIG. 3.

In the terminal 10B, interference occurs on frequency channels CH2 and CH4, so that the interference table as shown in FIG. 17B is stored in the interference management unit 13A.

FIG. 17C shows an example of an interference table stored in the interference management unit 13A in the terminal 10C shown in FIG. 3.

In the terminal 10C, interference occurs on frequency channels CH1, CH3, and CH4, so that the interference table as shown in FIG. 17C is stored in the interference management unit 13A.

FIG. 17D shows an example of an interference table stored in the interference management unit 13A in the terminal 10D shown in FIG. 3.

In the terminal 10D, interference occurs on frequency channels CH1, CH2, CH4, and CH5, so that the interference table as shown in FIG. 17D is stored in the interference management unit 13A.

FIGS. 18A and 18B show an example of a backoff table stored in the interference frequency channel number and backoff management unit 13B and indicating the number of frequency channels on which no interference is detected and the backoff time which is a wait time to the start of transmission of transmission data.

FIG. 18A shows an example of the backoff table including the backoff value set in the case where the frequency channel in the current beacon interval has interference. According to this backoff table, the backoff value is randomly set to 64 to 127 in the case where the frequency channel in the current beacon interval has interference.

FIG. 18B shows an example of the backoff table including the backoff value corresponding to the number of frequency channels with no interference in the case where the frequency channel in the current beacon interval has no interference. According to this backoff table, the backoff value is randomly set to 32 to 63 in the case where the number of frequency channels with no interference is five.

FIG. 19 shows an example of transmission data backoff control according to the present invention.

Suppose, in the system shown in FIG. 3, the control apparatus 20 switches the frequency channel as shown in FIG. 5.

In FIG. 19, it is assumed that data occurs in the terminal 10A at time T1 and in the terminal 10D at time T2, in data transmission and reception using frequency channel CH3 in the wireless communication interval 102.

When transmission data occurs, the terminal 10A temporarily stores the transmission data in the transmission buffer 11A.

After the transmission data is stored in the transmission buffer 11A, the backoff control unit 13C in the terminal 10A obtains information of the frequency channel in the current beacon interval from the frequency channel setting unit 11D.

Having obtained the information of frequency channel CH3 in the current beacon interval from the frequency channel setting unit 11D, the backoff control unit 13C compares the obtained information with the information of the interference table stored in the interference management unit 13A as shown in FIG. 17A, to check that no interference occurs in the current beacon interval.

Having checked that no interference occurs in the current beacon interval, the backoff control unit 13C obtains the number of frequency channels with no interference from the interference table, and compares the obtained number of frequency channels with the information of the backoff table stored in the interference frequency channel number and backoff management unit 13B as shown in FIG. 18B.

In the terminal 10A, the number of frequency channels with no interference is four. Accordingly, the backoff control unit 13C obtains the backoff value from 16 to 31, from the backoff table in FIG. 18B.

The backoff control unit 13C randomly sets the backoff value from 16 to 31, and starts the operation of the backoff timer 13D. It is assumed here that the backoff value is determined as 24.

When transmission data occurs, the terminal 10D temporarily stores the transmission data in the transmission buffer 11A.

After the transmission data is stored in the transmission buffer 11A, the backoff control unit 13C in the terminal 10D obtains information of the frequency channel in the current beacon interval from the frequency channel setting unit 11D.

Having obtained the information of frequency channel CH3 in the current beacon interval from the frequency channel setting unit 11D, the backoff control unit 13C compares the obtained information with the information of the interference table stored in the interference management unit 13A as shown in FIG. 17D, to check that no interference occurs in the current beacon interval.

Having checked that no interference occurs in the current beacon interval, the backoff control unit 13C obtains the number of frequency channels with no interference from the interference table, and compares the obtained number of frequency channels with the information of the backoff table stored in the interference frequency channel number and backoff management unit 13B as shown in FIG. 18B.

In the terminal 10D, the number of frequency channels with no interference is one. Accordingly, the backoff control unit 13C obtains the backoff value from 0 to 3, from the backoff table in FIG. 18B.

The backoff control unit 13C randomly sets the backoff value from 0 to 3, and starts the operation of the backoff timer 13D. It is assumed here that the backoff value is determined as 2.

When the backoff ends at time T3, the backoff timer 13D in the terminal 10D notifies the transmission buffer 11A of the end of the backoff.

When notified of the end of the backoff from the backoff timer 13D, the transmission buffer 11A passes the transmission data to the frame processing unit 11B.

The frame processing unit 11B in the terminal 10D adds a MAC header and an ECC to the transmission data, and passes the transmission data to the modulation and demodulation unit 11C.

The modulation and demodulation unit 11C in the terminal 10D adds a PHY header to the transmission data, and transmits the data using frequency channel CH3.

Meanwhile, when the terminal 10D detects the data at time T3, the terminal 10A suspends the backoff. The terminal 10A resumes the backoff at time T4 at which a predetermined time elapses from when the terminal 10D ends the transmission of the data.

When the backoff ends, the backoff timer 13D in the terminal 10A notifies the transmission buffer 11A of the end of the backoff.

When notified of the end of the backoff from the backoff timer 13D, the transmission buffer 11A passes the transmission data to the frame processing unit 11B.

The frame processing unit 11B in the terminal 10A adds a MAC header and an ECC to the transmission data, and passes the transmission data to the modulation and demodulation unit 11C.

The modulation and demodulation unit 11C in the terminal 10A adds a PHY header to the transmission data, and transmits the data using frequency channel CH3.

Figure 20:
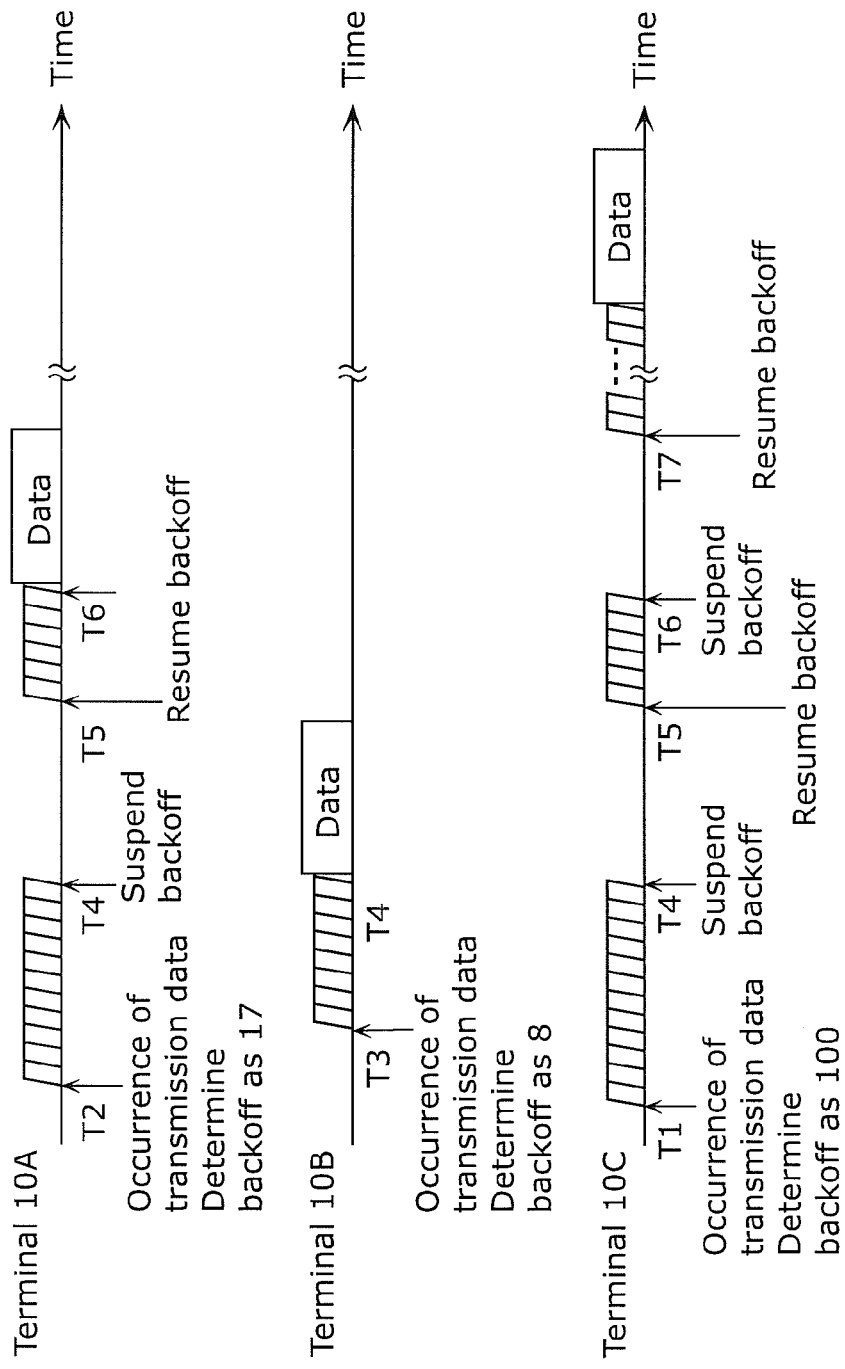
FIG. 20 is a diagram showing another example of backoff control according to Embodiment 1 of the present invention.

FIG. 20 shows another example of transmission data backoff control according to the present invention.

It is assumed here that data occurs in the terminal 10A at time T2, in the terminal 10B at time T3, and in the terminal 10C at time T1, in data transmission and reception using frequency channel CH1 in the wireless communication interval 105.

When transmission data occurs, the terminal 10C temporarily stores the transmission data in the transmission buffer 11A.

After the transmission data is stored in the transmission buffer 11A, the backoff control unit 13C in the terminal 10C obtains information of the frequency channel in the current beacon interval from the frequency channel setting unit 11D.

Having obtained the information of frequency channel CH1 in the current beacon interval from the frequency channel setting unit 11D, the backoff control unit 13C compares the obtained information with the information of the interference table stored in the interference management unit 13A as shown in FIG. 17C, to check that interference occurs in the current beacon interval.

Having checked that interference occurs in the current beacon interval, the backoff control unit 13C references to the information of the backoff table stored in the interference frequency channel number and backoff management unit 13B as shown in FIG. 18A.

The terminal 10C obtains the backoff value from 64 to 127, from the backoff table in FIG. 18A.

The backoff control unit 13C randomly sets the backoff value from 64 to 127, and starts the operation of the backoff timer 13D. It is assumed here that the backoff value is determined as 100.

When transmission data occurs, the terminal 10A temporarily stores the transmission data in the transmission buffer 11A.

After the transmission data is stored in the transmission buffer 11A, the backoff control unit 13C in the terminal 10A obtains information of the frequency channel in the current beacon interval from the frequency channel setting unit 11D.

Having obtained the information of frequency channel CH1 in the current beacon interval from the frequency channel setting unit 11D, the backoff control unit 13C compares the obtained information with the information of the interference table stored in the interference management unit 13A as shown in FIG. 17A, to check that no interference occurs in the current beacon interval.

Having checked that no interference occurs in the current beacon interval, the backoff control unit 13C obtains the number of frequency channels with no interference from the interference table, and compares the obtained number of frequency channels with the information of the backoff table stored in the interference frequency channel number and backoff management unit 13B as shown in FIG. 18B.

In the terminal 10A, the number of frequency channels with no interference is four. Accordingly, the backoff control unit 13C obtains the backoff value from 16 to 31, from the backoff table in FIG. 18B.

The backoff control unit 13C randomly sets the backoff value from 16 to 31, and starts the operation of the backoff timer 13D. It is assumed here that the backoff value is determined as 17.

When transmission data occurs, the terminal 10B temporarily stores the transmission data in the transmission buffer 11A.

After the transmission data is stored in the transmission buffer 11A, the backoff control unit 13C in the terminal 10B obtains information of the frequency channel in the current beacon interval from the frequency channel setting unit 11D.

Having obtained the information of frequency channel CH1 in the current beacon interval from the frequency channel setting unit 11D, the backoff control unit 13C compares the obtained information with the information of the interference table stored in the interference management unit 13A as shown in FIG. 17B, to check that no interference occurs in the current beacon interval.

Having checked that no interference occurs in the current beacon interval, the backoff control unit 13C obtains the number of frequency channels with no interference from the interference table, and compares the obtained number of frequency channels with the information of the backoff table stored in the interference frequency channel number and backoff management unit 13B as shown in FIG. 18B.

In the terminal 10B, the number of frequency channels with no interference is three. Accordingly, the backoff control unit 13C obtains the backoff value from 8 to 15, from the backoff table in FIG. 18B.

The backoff control unit 13C randomly sets the backoff value from 8 to 15, and starts the operation of the backoff timer 13D. It is assumed here that the backoff value is determined as 8.

When the backoff ends at time T4, the backoff timer 13D in the terminal 10B notifies the transmission buffer 11A of the end of the backoff.

When notified of the end of the backoff from the backoff timer 13D, the transmission buffer 11A passes the transmission data to the frame processing unit 11B.

The frame processing unit 11B in the terminal 10B adds a MAC header and an ECC to the transmission data, and passes the transmission data to the modulation and demodulation unit 11C.

The modulation and demodulation unit 11C in the terminal 10B adds a PHY header to the transmission data, and transmits the data using frequency channel CH1.

Meanwhile, when the terminal 10B detects the data at time T4, the terminals 10A and 10C each suspend the backoff. The terminals 10A and 10C each resume the backoff at time T5 at which a predetermined time elapses from when the terminal 10B ends the transmission of the data.

When the backoff ends, the backoff timer 13D in the terminal 10A notifies the transmission buffer 11A of the end of the backoff.

When notified of the end of the backoff from the backoff timer 13D, the transmission buffer 11A passes the transmission data to the frame processing unit 11B.

The frame processing unit 11B in the terminal 10A adds a MAC header and an ECC to the transmission data, and passes the transmission data to the modulation and demodulation unit 11C.

The modulation and demodulation unit 11C in the terminal 10A adds a PHY header to the transmission data, and transmits the data using frequency channel CH1.

When the terminal 10A detects the data at time T6, the terminal 10C suspends the backoff. The terminal 10C resumes the backoff at time T7 at which a predetermined time elapses from when the terminal 10A ends the transmission of the data.

When the backoff ends, the backoff timer 13D in the terminal 10C notifies the transmission buffer 11A of the end of the backoff.

When notified of the end of the backoff from the backoff timer 13D, the transmission buffer 11A passes the transmission data to the frame processing unit 11B.

The frame processing unit 11B in the terminal 10C adds a MAC header and an ECC to the transmission data, and passes the transmission data to the modulation and demodulation unit 11C.

The modulation and demodulation unit 11C in the terminal 10C adds a PHY header to the transmission data, and transmits the data using frequency channel CH1.

As described above, in the backoff control of this embodiment, the terminal can set a different backoff value depending on the frequency channel, which produces an advantageous effect of preventing a decrease in communication efficiency of the entire system. For example, the terminal 10D sets the backoff value of 0 to 3 for frequency channel CH3, and the backoff value of 64 to 127 for the other frequency channels.

Moreover, by setting a larger maximum backoff value when the number of frequency channels on which no interference is detected is larger, the opportunity of transmitting transmission data from a terminal with a smaller number of frequency channels on which no interference is detected can be increased.

For instance, in the case of the terminal 10D where the number of frequency channels on which no interference is detected is one (CH3), if data cannot be transmitted using frequency channel CH3, there is a high possibility of a transmission delay until frequency channel CH3 in the next superframe interval. However, by applying the backoff control of this embodiment, the transmission opportunity for the terminal 10D can be increased because the maximum backoff time of the terminal 10D is set to be smaller than that of the other terminals. In so doing, the transmission delay can be significantly reduced. On the other hand, in the case of the terminal 10A where the number of frequency channels on which no interference is detected is four, even when transmission cannot be performed using frequency channel CH3, frequency channel CH4 in the next beacon interval is also a frequency channel on which no interference is detected, and therefore the terminal 10A can transmit data using frequency channel CH4. As a result, a decrease in communication efficiency of the entire system can be avoided.

In addition, in the backoff control of this embodiment, the maximum backoff time in the case where the terminal transmits data using a frequency channel on which interference is detected is larger than the maximum backoff time in the case where the terminal transmits data using a frequency channel on which no interference is detected. This gives a higher priority to transmission by another terminal for which no interference is detected on the frequency channel, with it being possible to produce an advantageous effect of preventing a decrease in communication efficiency of the entire system.

For example, in the case of the terminal 10D where the number of frequency channels on which no interference is detected is only one (CH3), the maximum backoff time is 3, which contributes to a greater transmission opportunity than the terminals 10A to 10C. However, since interference is detected on frequency channels CH1, CH2, CH4, and CH5, there is a high possibility of a transmission failure due to interference even when the terminal 10D transmits data on these frequency channels. Besides, the smaller maximum backoff time of the terminal 10D than those of the terminals 10A to 10C has a high likelihood of decreasing the transmission opportunity for each of the terminals 10A to 10C. By applying the backoff control of this embodiment, however, the terminal 10D sets the minimum backoff time in the beacon interval of each of frequency channels CH1, CH2, CH4, and CH5 on which interference is detected, to be larger than 63 which is the maximum backoff time in the case where no interference is detected. This gives a higher priority to transmission by the terminals 10A to 10C for which no interference is detected. Moreover, by exercising this backoff control, the terminal 10D is allowed to attempt to transmit data in the event that data is not detected in any of the terminals 10A to 10C.

Though this embodiment describes the case where the interference frequency channel number and backoff management unit 13B holds the backoff table shown in FIG. 18B, the present invention is not limited to such. For example, the interference frequency channel number and backoff management unit 13B may hold a backoff table indicating the backoff value corresponding to the number of frequency channels on which interference is detected, as shown in FIG. 21.

Though this embodiment describes the case where the interference frequency channel number and backoff management unit 13B holds the backoff table shown in FIGS. 18A and 18B, the present invention is not limited to such. For example, the interference frequency channel number and backoff management unit 13B may hold a backoff table indicating the backoff value where all minimum backoff times are 0, as shown in FIGS. 22A and 22B.

Though this embodiment describes the case where the interference frequency channel number and backoff management unit 13B holds the backoff table shown in FIG. 18B, the present invention is not limited to such. For example, the interference frequency channel number and backoff management unit 13B may hold a backoff table indicating the same backoff value for different numbers of frequency channels, as shown in FIG. 23. In the backoff table in FIG. 23, the backoff value is 0 to 3 in the case where the number of frequency channels on which no interference is detected is one to three, and the backoff value is 4 to 7 in the case where the number of frequency channels on which no interference is detected is four to five.

Though this embodiment describes the case where the interference frequency channel number and backoff management unit 13B holds the backoff table shown in FIG. 18B, the present invention is not limited to such. For example, the interference frequency channel number and backoff management unit 13B may store relational expressions for the backoff and the number of frequency channels on which no interference is detected, as shown in FIG. 24. In detail, the maximum backoff time is calculated at $2^{((the\ number\ of\ communicable\ frequency\ channels)+1)}-1$. The minimum backoff time is calculated at 0 in the case where the number of frequency channels on which no interference is detected is one, and calculated at $2^{(the\ number\ of\ communicable\ frequency\ channels)}$ in the case where the number of frequency channels on which no interference is detected is two or more. The information of the backoff table shown in FIG. 18A may be stored as relational expressions, too. Note that the present invention is not limited to these relational expressions.

Figures 25, 26, 27:
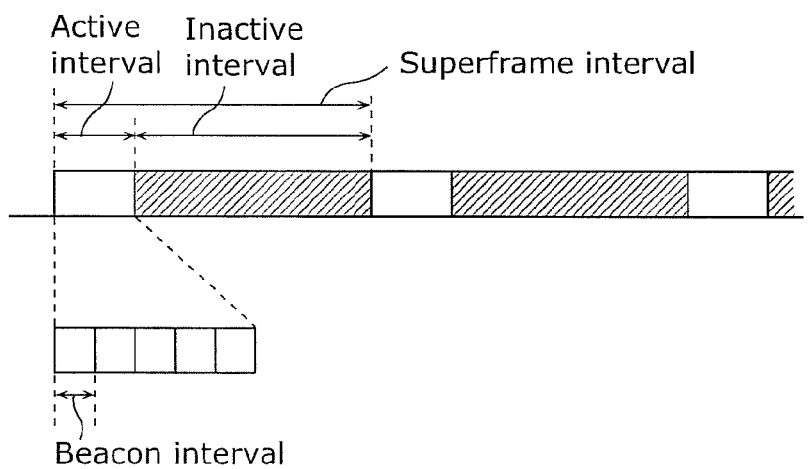
FIG. 25 is a diagram showing another example of the backoff table stored in the interference frequency channel number and backoff management unit in the terminal according to Embodiment 1 of the present invention.
FIG. 26 is a diagram showing another example of the backoff table stored in the interference frequency channel number and backoff management unit in the terminal according to Embodiment 1 of the present invention.
FIG. 27 is a schematic diagram showing another example of the structure of the superframe according to the present invention.

Though this embodiment describes the case where the interference frequency channel number and backoff management unit 13B holds the backoff table shown in FIGS. 18A and 18B, the present invention is not limited to such. For example, the interference frequency channel number and backoff management unit 13B may hold a backoff table indicating the backoff value corresponding to the data type in addition to the number of frequency channels on which no interference is detected, as shown in FIG. 25. In this case, the backoff control unit 13C in the terminal 10 determines the backoff value from the data type of the transmission data fed to the transmission buffer 11A and the information of the interference table. Alternatively, a structure of a backoff table shown in FIG. 26 may be used. In the case of using the backoff table shown in FIG. 25 or 26, the terminal 10 may include the backoff timer 13D dedicated to each individual data type.

Though this embodiment describes the case where the superframe interval is made up of only beacon intervals, the present invention is not limited to such. For example, a structure shown in FIGS. 27 and 28 may be employed. FIG. 27 is a schematic diagram showing cycles of transmitting beacon frames in time sequence. A largest cycle is a superframe interval. The superframe interval is composed of an active interval in which wireless communication is performed and an inactive interval in which no wireless communication is performed. In the inactive interval, the control apparatus 20 and the terminals 10A to 10D can minimize power consumption of the functional blocks necessary for wireless communication. Hence, the provision of the inactive interval makes it possible to save power consumption of each wireless terminal. The active interval is further divided into beacon intervals as cycles in each of which the control apparatus 20 transmits a beacon frame. In FIG. 27, five beacon intervals are provided in the active interval.

Figure 28:
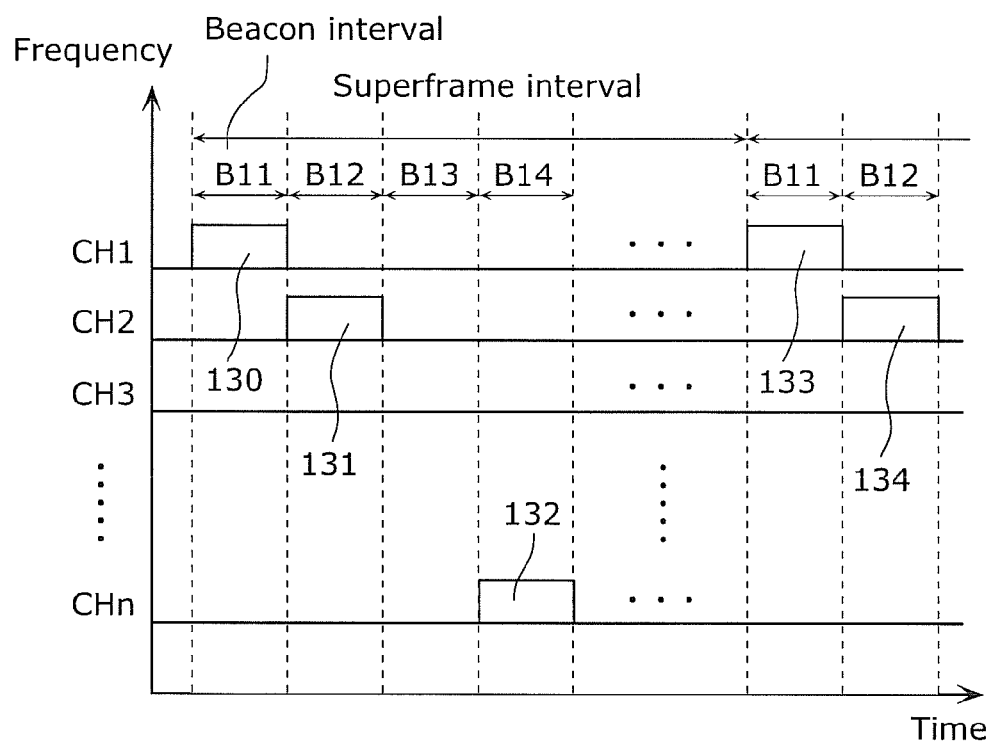
FIG. 28 is a schematic diagram showing another example of the beacon intervals and the arrangement of frequency channels according to the present invention.

The structure of the superframe interval is shown in time sequence in FIG. 27. The control apparatus 20 and the terminals 10A to 10D are capable of performing wireless communication while switching between a plurality of frequency channels, and communicate with each other while switching between the plurality of frequency channels in units of beacon intervals. FIG. 28 is a schematic diagram showing channel arrangement in beacon intervals in the case of switching between the plurality of frequency channels in units of beacon intervals.

In FIG. 28, the control apparatus 20 allocates frequency channel CH1 to beacon interval BI1 in a superframe interval to set a wireless communication interval 130. Likewise, the control apparatus 20 allocates frequency channel CH2 to beacon interval BI2 to set a wireless communication interval 131, and allocates frequency channel CHn to beacon interval BI4 to set a wireless communication interval 132. When the superframe interval ends and the next superframe interval begins, the control apparatus 20 again allocates frequency channel CH1 to beacon interval BI1 to set a wireless communication interval 133, and allocates frequency channel CH2 to beacon interval BI2 to set a wireless communication interval 134. The control apparatus 20 repeats the same frequency channel allocation for each superframe interval.

In FIG. 28, for example, in the case where the terminal 10B communicates using frequency channel CH1, the terminal 10B operates only in beacon interval BI1. That is, the terminal 10B communicates by CSMA during the access interval in the wireless communication interval 130 and then during the access interval in the wireless communication interval 133, without performing wireless communication in an interval between the wireless communication intervals 130 and 133. This enables the terminal 10B to minimize power consumption of the functional blocks necessary for wireless communication, as in an inactive interval. In the event that the terminal 10B cannot complete data transmission on frequency channel CH1, however, the terminal 10B references to the channel use sequence 124 in the payload 120 of the beacon frame, and transmits data on the next frequency channel CH2.

In FIG. 27, the whole interval in which the control apparatus 20 performs communication in the wireless network is regarded as the active interval. When focusing on, for example, frequency channel CH1, however, it is also possible to regard the wireless communication intervals 130 and 133 in FIG. 28 as an active interval and an interval including the wireless communication intervals 131, 132, and 134 as an inactive interval. In this case, an active interval of frequency channel CH2 can be regarded as being set in an inactive interval of frequency channel CH1. Here, an active interval in FIGS. 27 and 28 can be calculated by multiplying the beacon interval 122 by the number of beacon intervals 123 in FIG. 11, and an inactive interval in FIGS. 27 and 28 can be calculated by subtracting the calculated active interval from the superframe interval 121.

Figure 29:
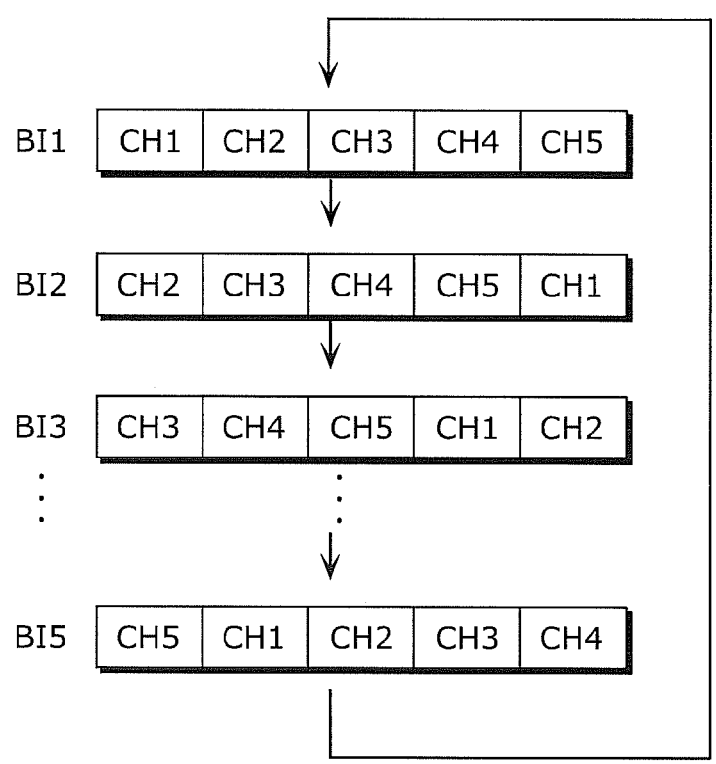
FIG. 29 is a schematic diagram showing another example of the channel use sequence in the payload of the beacon frame according to the present invention.

Though this embodiment describes the case where the channel use sequence 124 in the beacon frame has the structure shown in FIG. 12, the channel use sequence 124 may instead have a structure shown in FIG. 29. In the structure shown in FIG. 29, the frequency channel positioned first is the frequency channel currently in use, and the channel use sequence is changed each time the beacon interval ends, without using the beacon interval number BN. This indicates that, for each beacon interval, the first frequency channel in the channel use sequence 124 is the frequency channel currently in use, and the next frequency channel in the channel use sequence 124 is the frequency channel used in the next beacon interval. As an example, for beacon interval BI3, the frequency channel used in the current beacon interval is CH3, the frequency channel used in the next beacon interval is CH4, and the frequency channel used in the beacon interval following the next beacon interval is CH5.

Though this embodiment describes the case where the backoff table is stored in the interference frequency channel number and backoff management unit 13B beforehand, the present invention is not limited to such. For example, the control apparatus 20 may store the backoff table beforehand so that the terminal 10 obtains the backoff table from the control apparatus 20 and stores the backoff table in the interference frequency channel number and backoff management unit 13B upon initial activation.

Though this embodiment describes the case where the number of frequency channels on which no interference is detected is shown in the interference table in the interference management unit 13A, the present invention is not limited to this. For example, the number of frequency channels on which interference is detected may be shown in the interference table.

Though this embodiment describes the case where the terminal 10 determines the backoff value according to the number of frequency channels on which interference is detected from among all supported frequency channels, the present invention is not limited to such. For example, the terminal 10 may perform interference detection on the frequency channels included in the channel use sequence 124 in the payload 120 of the beacon frame, to determine the number of frequency channels on which no interference is detected.

Though this embodiment describes the case where the terminal 10 performs interference detection on each frequency channel after receiving the beacon frame, the present invention is not limited to this. For example, the terminal 10 may perform interference detection before receiving the beacon frame.

Though this embodiment describes the case where the terminal 10 controls the backoff value for each frequency channel, the present invention is not limited to such. For example, the control apparatus 20 may have the same structure as the terminal 10 and exercise the same control.

Though this embodiment describes the case where the terminal 10 transmits data to the control apparatus 20, the present invention is not limited to such. For example, the terminal 10 may directly transmit data to another terminal 10. In this case, the interference table in the other terminal 10 may be obtained to determine the number of frequency channels on which no interference is detected while excluding any frequency channel on which interference is detected in the other terminal 10.

Though this embodiment describes the case where interference detection is performed upon initial activation, the present invention is not limited to such. For example, interference detection may be performed on a regular basis, performed when the number of data transmission failures reaches a predetermined number, or performed when instructed by the control apparatus 20. Interference detection may be performed at any other timing.

Embodiment 2

Figure 30:
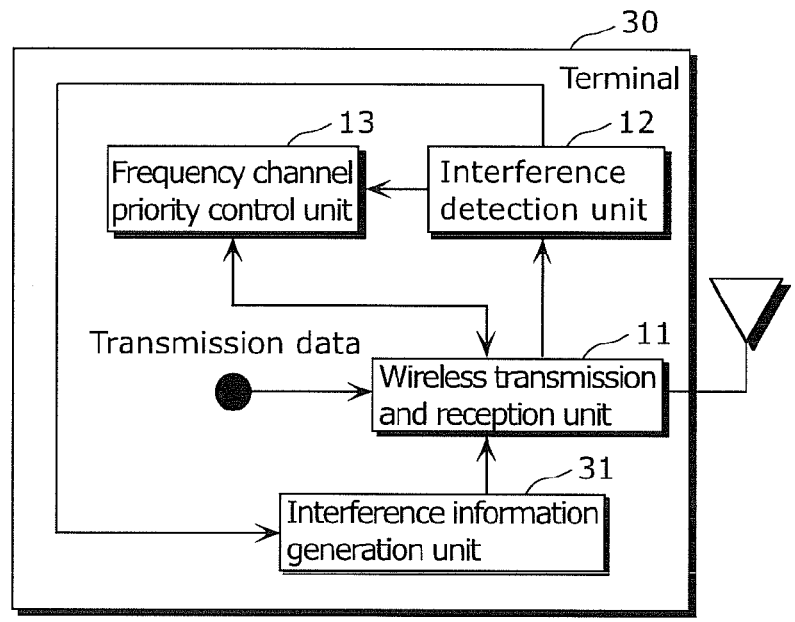
FIG. 30 is a block diagram showing a structure of a terminal according to Embodiment 2 of the present invention.

FIG. 30 is a functional block diagram showing a structure of a terminal according to Embodiment 2 of the present invention. In FIG. 30, the same components as those in the terminal 10 shown in FIG. 1 are given the same reference signs, and their description is omitted.

A terminal 30 includes the wireless transmission and reception unit 11, the interference detection unit 12, the frequency channel priority control unit 13, and an interference information generation unit 31.

The wireless transmission and reception unit 11, the interference detection unit 12, and the frequency channel priority control unit 13 have the same structures as in Embodiment 1.

The interference information generation unit 31 generates an interference information frame having a payload that includes a result of detection by the interference detection unit 12.

Figure 31:
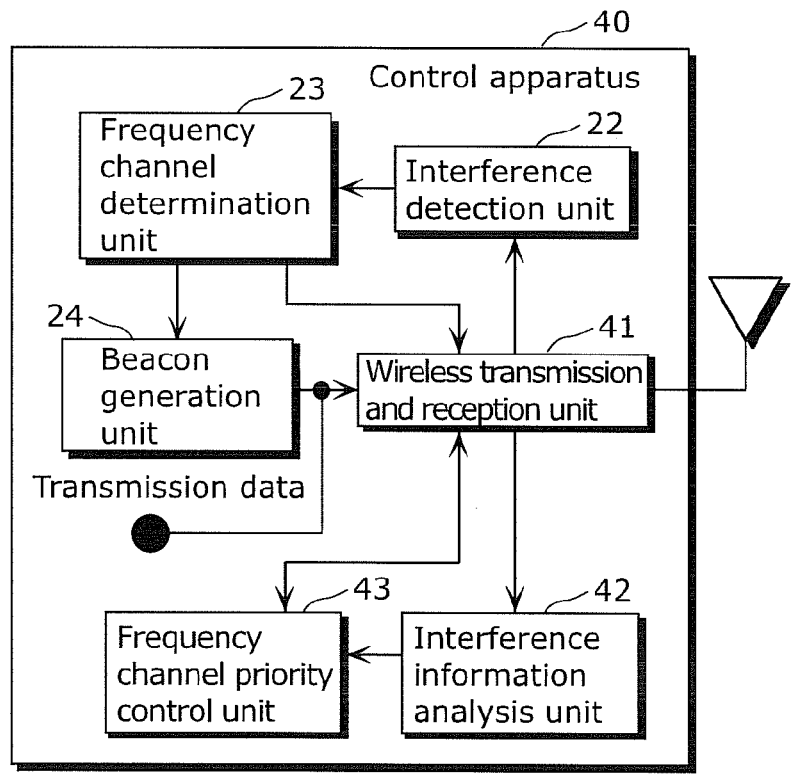
FIG. 31 is a block diagram showing a structure of a control apparatus according to Embodiment 2 of the present invention.

FIG. 31 is a functional block diagram showing a structure of a control apparatus according to Embodiment 2 of the present invention. In FIG. 31, the same components as those in the control apparatus 20 shown in FIG. 2 are given the same reference signs, and their description is omitted.

A control apparatus 40 includes the interference detection unit 22, the frequency channel determination unit 23, the beacon generation unit 24, a wireless transmission and reception unit 41, an interference information analysis unit 42, and a frequency channel priority control unit 43.

The interference detection unit 22, the frequency channel determination unit 23, and the beacon generation unit 24 have the same structures as in Embodiment 1.

The wireless transmission and reception unit 41 has a buffer function of temporarily storing transmission data, in addition to the functions of the wireless transmission and reception unit 21. The interference information analysis unit 42 analyzes a payload of an interference information frame received from the terminal 30. The frequency channel priority control unit 43 changes a priority used when the wireless transmission and reception unit 41 transmits a signal, according to a result of analysis by the interference information analysis unit 42.

This embodiment differs from Embodiment 1 in that the control apparatus controls the backoff value of the data to be transmitted to the terminal, according to the interference state of the terminal.

Figure 32:
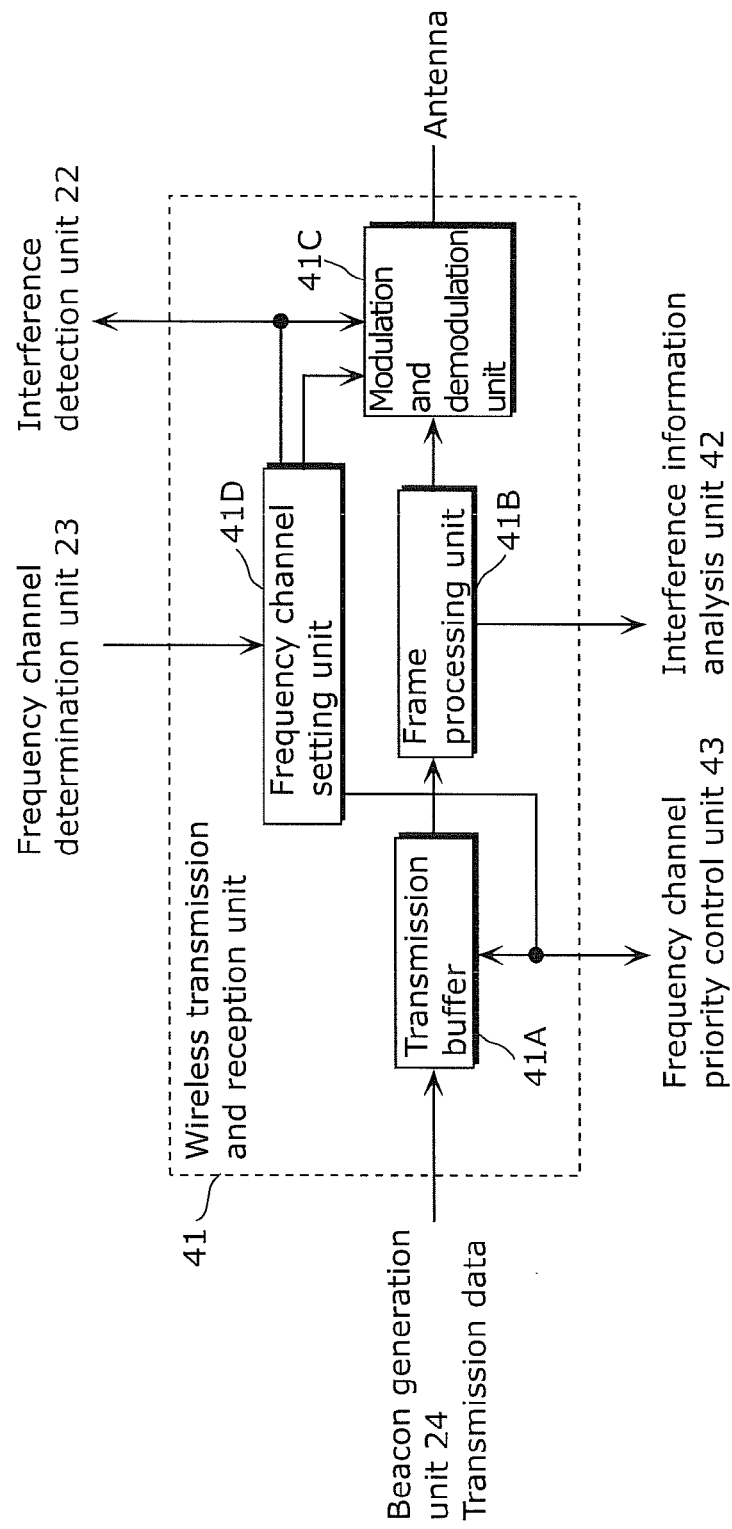
FIG. 32 is a block diagram showing an internal structure of a wireless transmission and reception unit in the control apparatus according to Embodiment 2 of the present invention.

FIG. 32 is a block diagram showing an internal structure of the wireless transmission and reception unit 41 in the control apparatus 40.

The wireless transmission and reception unit 41 includes a transmission buffer 41A, a frame processing unit 41B, a modulation and demodulation unit 41C, and a frequency channel setting unit 41D.

The transmission buffer 41A is a storage device for temporarily storing transmission data. The frame processing unit 41B sets wireless header information and the like, in the transmission data outputted from the transmission buffer 41A. The frequency channel setting unit 41D sets a frequency channel used when the modulation and demodulation unit 41C transmits or receives data. The modulation and demodulation unit 41C performs demodulation of a frame inputted from an antenna and modulation of a frame outputted to the wireless network, in the set frequency channel.

Figure 33:
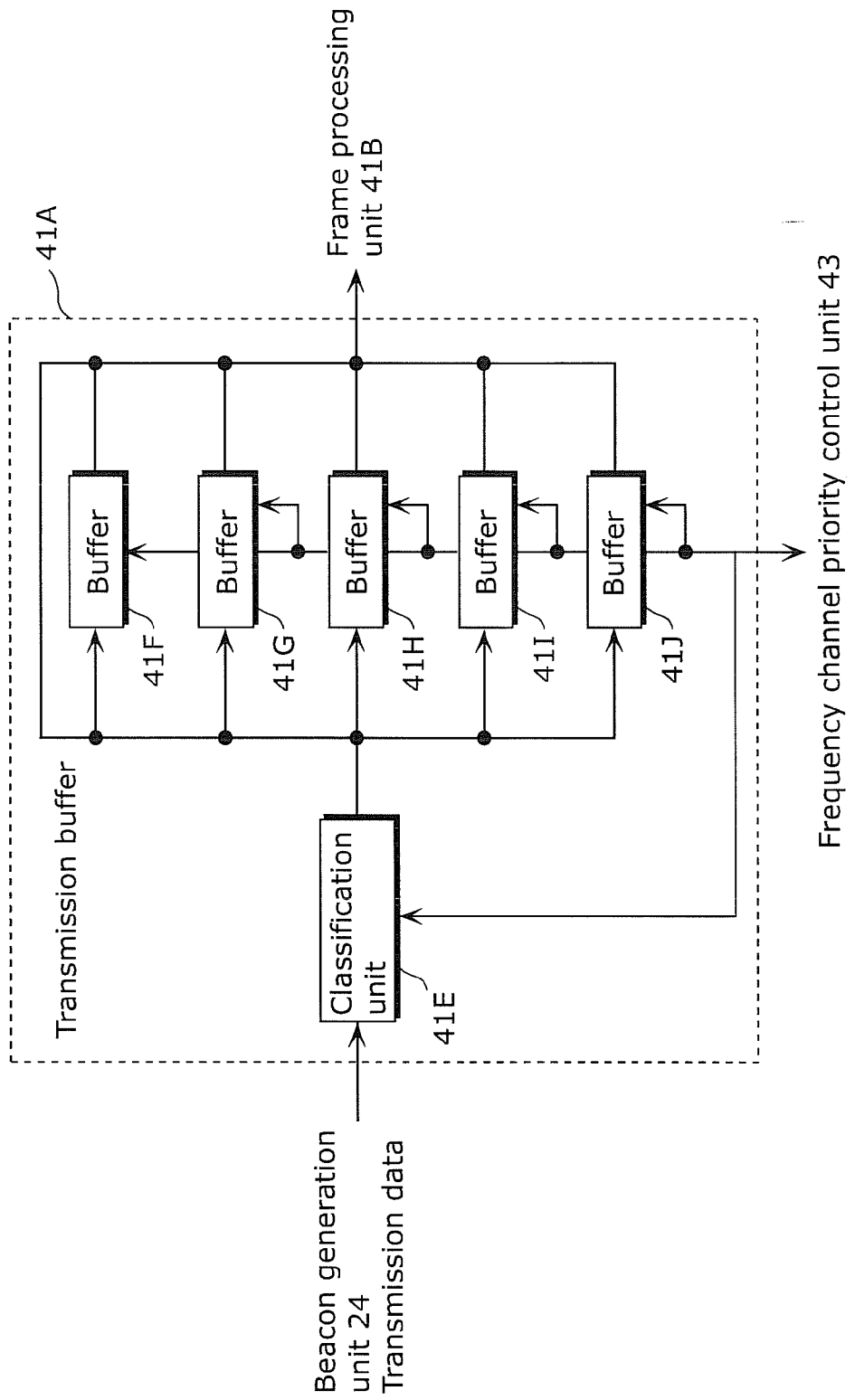
FIG. 33 is a block diagram showing an internal structure of a transmission buffer in the control apparatus according to Embodiment 2 of the present invention.

FIG. 33 is a block diagram showing an internal structure of the transmission buffer 41A in the control apparatus 40.

The transmission buffer 41A includes a classification unit 41E and buffers 41F to 41J.

The classification unit 41E classifies inputted transmission data, using information held in the frequency channel priority control unit 43. The buffers 41F to 41J are each a storage device for temporarily storing data classified by the classification unit 41E.

FIG. 34 shows an example of a classification table stored in the classification unit 41E.

The classification table includes information of a buffer for storing transmission data, according to the number of frequency channels on which no interference is detected at a destination terminal. For example, the classification table includes information indicating that data is to be stored in the buffer 41F in the case where the number of frequency channels on which no interference is detected is one. The classification table also includes information indicating that, in the case where transmission data is a beacon frame, the beacon frame is to be passed to the frame processing unit 41B without being temporarily stored in a buffer.

Figure 35:
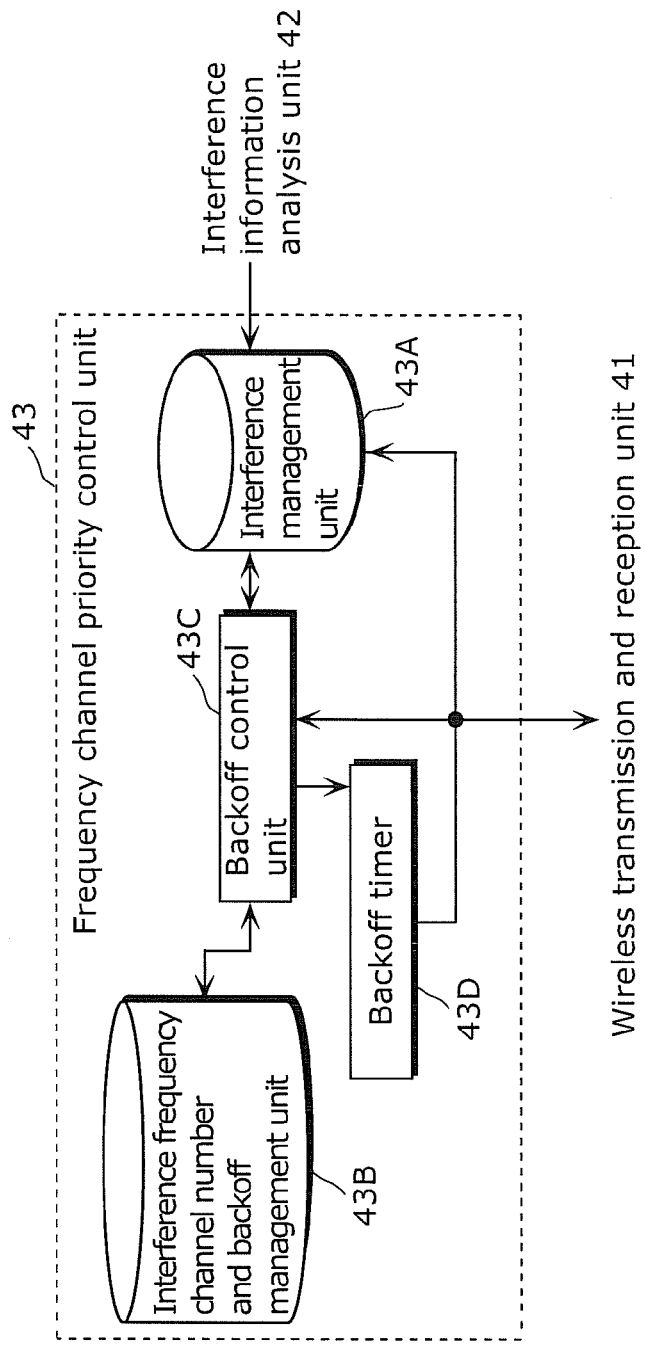
FIG. 35 is a block diagram showing an internal structure of a frequency channel priority control unit in the control apparatus according to Embodiment 2 of the present invention.

FIG. 35 is a block diagram showing an internal structure of the frequency channel priority control unit 43 in the control apparatus 40.

The frequency channel priority control unit 43 includes an interference management unit 43A, an interference frequency channel number and backoff management unit 43B, a backoff control unit 43C, and a backoff timer 43D. The interference management unit 43A is a storage device for storing an interference detection result of the terminal 30 that is included in a payload of an interference information frame received from the terminal 30 and is received from the interference information analysis unit 42. The interference frequency channel number and backoff management unit 43B manages the number of frequency channels on which no interference is detected at the terminal 30 and the backoff time which is a wait time to the start of transmission of transmission data, in association with each other. The backoff control unit 43C determines the backoff value of the transmission data, using the information in the interference management unit 43A and the interference frequency channel number and backoff management unit 43B. The backoff timer 43D is a timer that operates with the value set by the backoff control unit 43C.

Figure 36:
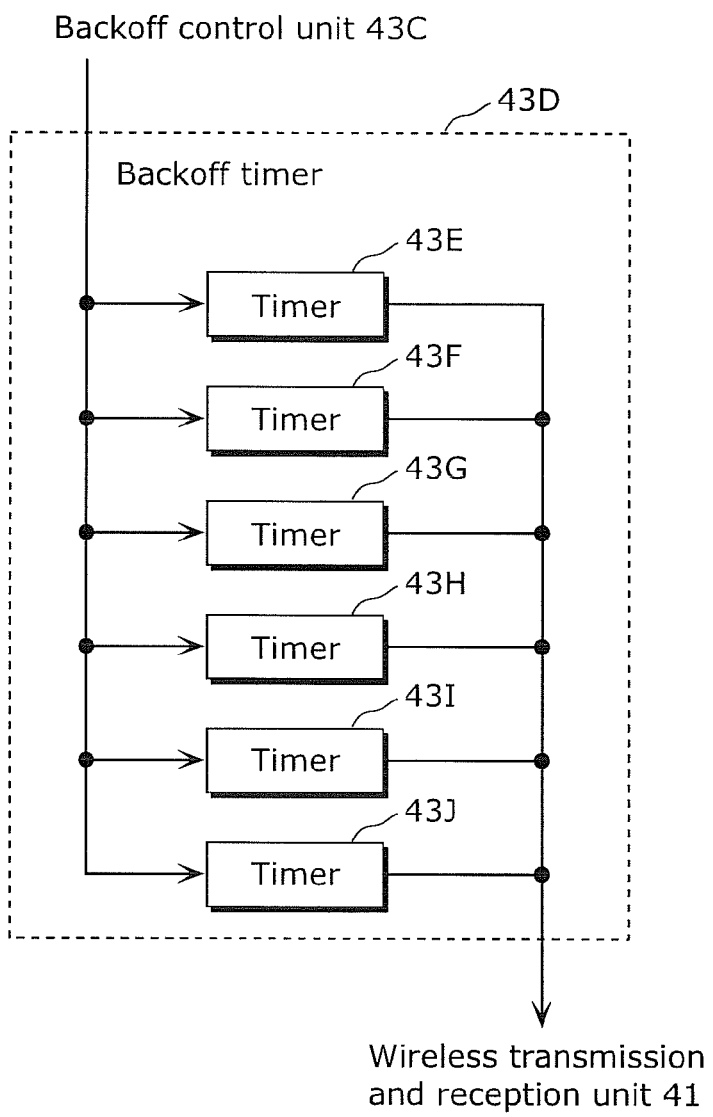
FIG. 36 is a block diagram showing an internal structure of a backoff timer in the control apparatus according to Embodiment 2 of the present invention.

FIG. 36 is a block diagram showing an internal structure of the backoff timer 43D in the control apparatus 40.

The backoff timer 43D includes timers 43E to 43J each of which operates with the value set by the backoff control unit 43C.

FIG. 37 shows an example of an interference table stored in the interference management unit 43A and indicating the presence or absence of interference on each of frequency channels CH1 to CH5.

The interference table includes, for each terminal, information indicating the presence or absence of interference on each frequency channel and the number of frequency channels with no interference. For example, in the terminal 30A, no interference is detected on frequency channels CH1 and CH3 to CH5, while interference is detected on frequency channel CH2. Moreover, the number of frequency channels with no interference in the terminal 30A is four.

It is assumed here that the interference detection result of each terminal is the same as that in Embodiment 1.

The interference table is generated from the information of the interference detection result included in the payload of the interference information frame received from the terminal 30.

FIGS. 38A and 38B show an example of a backoff table stored in the interference frequency channel number and backoff management unit 43B and indicating the number of frequency channels on which no interference is detected and the backoff time which is a wait time to the start of transmission of transmission data.

FIG. 38A shows an example of the backoff table indicating the backoff value set and the backoff timer used in the case where the frequency channel in the current beacon interval has interference at the destination terminal of transmission data.

As an example, in the case where the frequency channel in the current beacon interval has interference at the destination terminal, the maximum backoff value is 64 to 127, and the backoff timer to be used is the timer 43E.

FIG. 38B shows an example of the backoff table indicating the backoff value and the backoff timer corresponding to the number of frequency channels with no interference in the case where the frequency channel in the current beacon interval has no interference at the destination terminal of transmission data.

As an example, in the case where the number of frequency channels with no interference is one, the transmission buffer for storing data is the buffer 41F, the backoff value is 0 to 3, and the backoff timer to be used is the timer 43F.

The following describes operations of the terminal 30 and the control apparatus 40 in Embodiment 2, with reference to FIGS. 39A to 41.

Figure 39A:
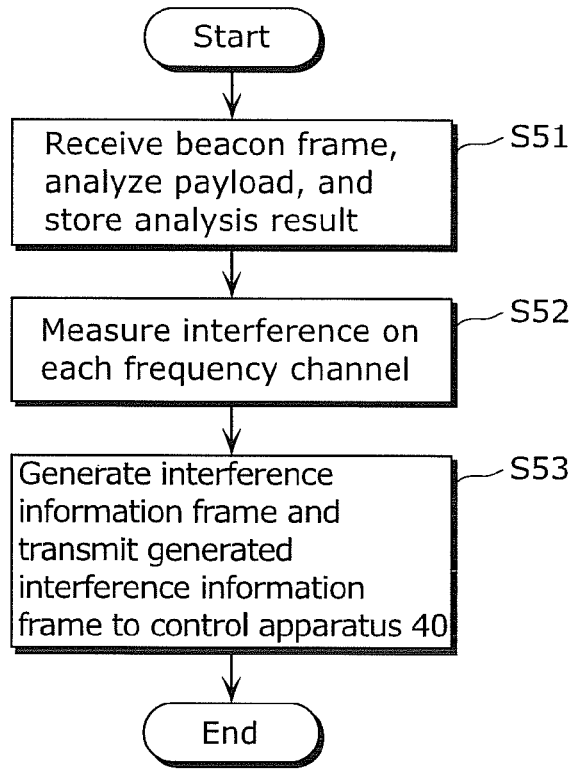
FIG. 39A is a diagram showing an example of an interference information frame exchange process flow according to Embodiment 2 of the present invention.
Figure 39B:
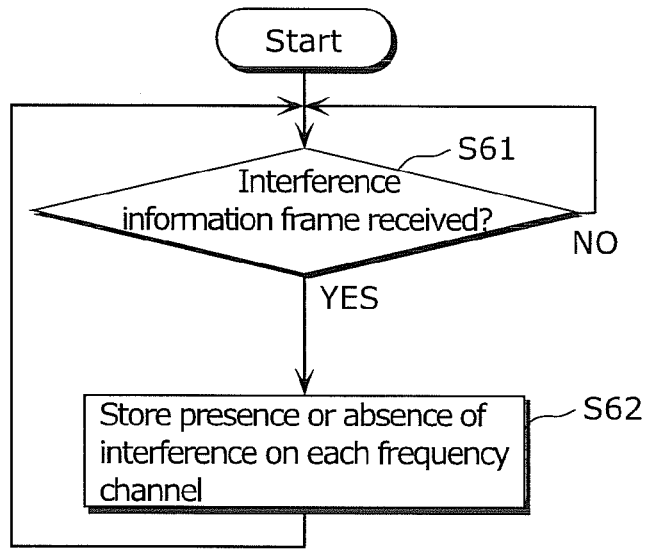
FIG. 39B is a diagram showing the example of the interference information frame exchange process flow according to Embodiment 2 of the present invention.

FIGS. 39A and 39B show an example of an interference information frame transmission and reception process flow.

FIG. 39A shows an example of an interference information frame transmission and reception process flow of the terminal 30.

When activated, the terminal 30 first starts scanning a beacon frame. Upon receiving the beacon frame, the terminal 30 analyzes a payload of the beacon frame, and stores an analysis result (Step S51).

The terminal 30 then measures interference on each frequency channel (Step S52).

The wireless transmission and reception unit 11 in the terminal 30 scans frequency channels CH1 to CH5 for a predetermined time. The wireless transmission and reception unit 11 passes a received signal to the interference detection unit 12.

The interference detection unit 12 performs interference detection. Here, the interference detection unit 12 determines, for each frequency channel, whether or not the frequency channel is available, by checking the presence or absence of interference effect through power measurement or the like.

The interference information generation unit 31 in the terminal 30 generates an interference information frame having a payload that includes a result of the determination by the interference detection unit 12, and transmits the interference information frame to the control apparatus 40 via the wireless transmission and reception unit 11 (Step S53).

FIG. 39B shows an example of an interference information frame transmission and reception process flow of the control apparatus 40. Upon receiving the interference information frame from the terminal 30, the modulation and demodulation unit 41C in the control apparatus 40 demodulates the interference information frame. The frame processing unit 41B in the control apparatus 40 analyzes a MAC header, and passes an analysis result to the interference information analysis unit 42 (Step S61: YES).

The interference information analysis unit 42 analyzes the payload of the interference information frame, and stores, in the interference management unit 43A, an interference detection result of the terminal 30 transmitting the interference information frame (Step S62).

Figure 40:
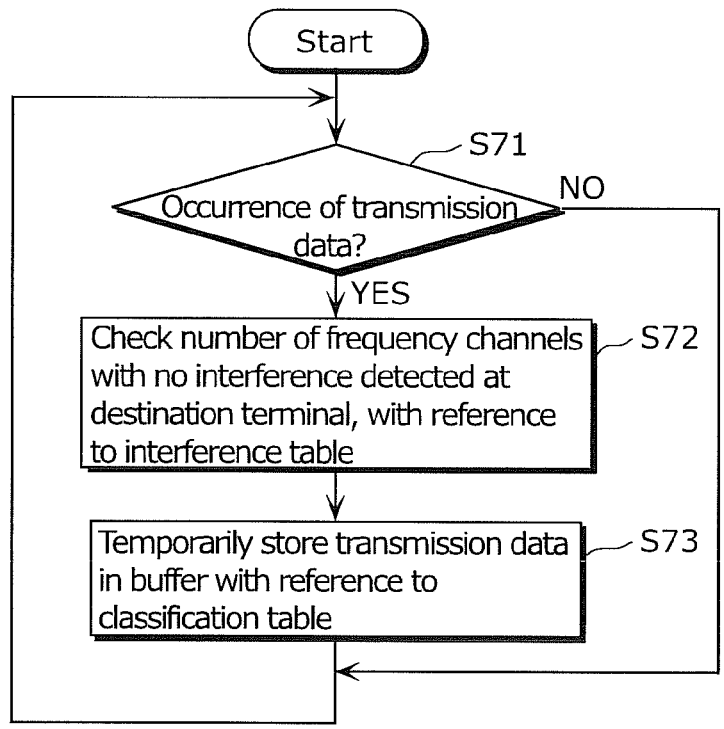
FIG. 40 is a diagram showing an example of a data classification process flow of the control apparatus according to Embodiment 2 of the present invention.

FIG. 40 shows an example of a transmission data classification process flow of the control apparatus 40.

When receiving transmission data from an upper layer not shown, the control apparatus 40 feeds the transmission data to the classification unit 41E in the wireless transmission and reception unit 41 (Step S71: YES).

Upon receiving the transmission data, the classification unit 41E analyzes destination terminal information of the transmission data, and checks the number of frequency channels on which no interference is detected at the destination terminal, with reference to the interference table stored in the interference management unit 43A in the frequency channel priority control unit 43 as shown in FIG. 37 (Step S72).

Next, the classification unit 41E temporarily stores the transmission data in the corresponding buffer, with reference to the classification table shown in FIG. 34 (Step S73). For example, when the destination of the transmission data is the terminal 30D, the transmission data is temporarily stored in the buffer 41F because the number of frequency channels on which no interference is detected at the terminal 30D is one.

Here, when the classification unit 41E receives a beacon frame from the beacon generation unit 24, the classification unit 41E passes the beacon frame to the frame processing unit 41B without temporarily storing it in a buffer.

Figure 41:
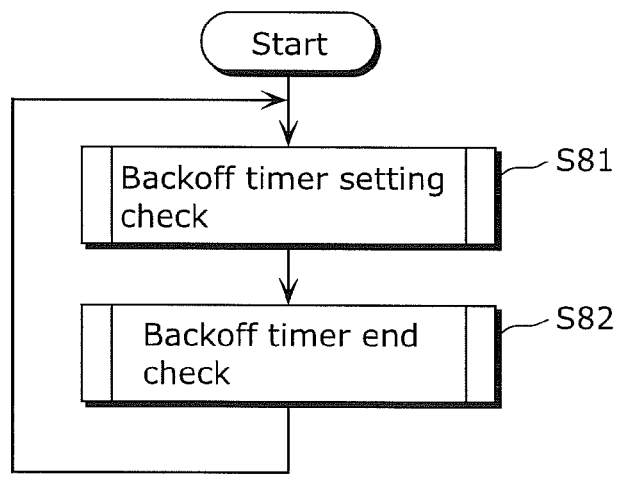
FIG. 41 is a diagram showing an example of a data transmission process flow of the control apparatus according to Embodiment 2 of the present invention.

FIG. 41 shows an example of a transmission data backoff control process flow of the control apparatus 40.

The backoff control unit 43C in the frequency channel priority control unit 43 in the control apparatus 40 checks whether or not transmission data is temporarily stored in the transmission buffer 41A. In the case where data is temporarily stored, the backoff control unit 43C sets the backoff, and starts the operation of one of the timers 43E to 43J in the backoff timer 43D (Step S81).

When the operation of one of the timers 43E to 43J in the backoff timer 43D ends, the wireless transmission and reception unit 41 passes the corresponding transmission data to the frame processing unit 41B (Step S82).

The frame processing unit 41B adds a MAC header to the transmission data, and passes the transmission data to the modulation and demodulation unit 41C. The modulation and demodulation unit 41C modulates the transmission data, and transmits the transmission data using the frequency channel set by the frequency channel setting unit 41D.

Figure 42A:
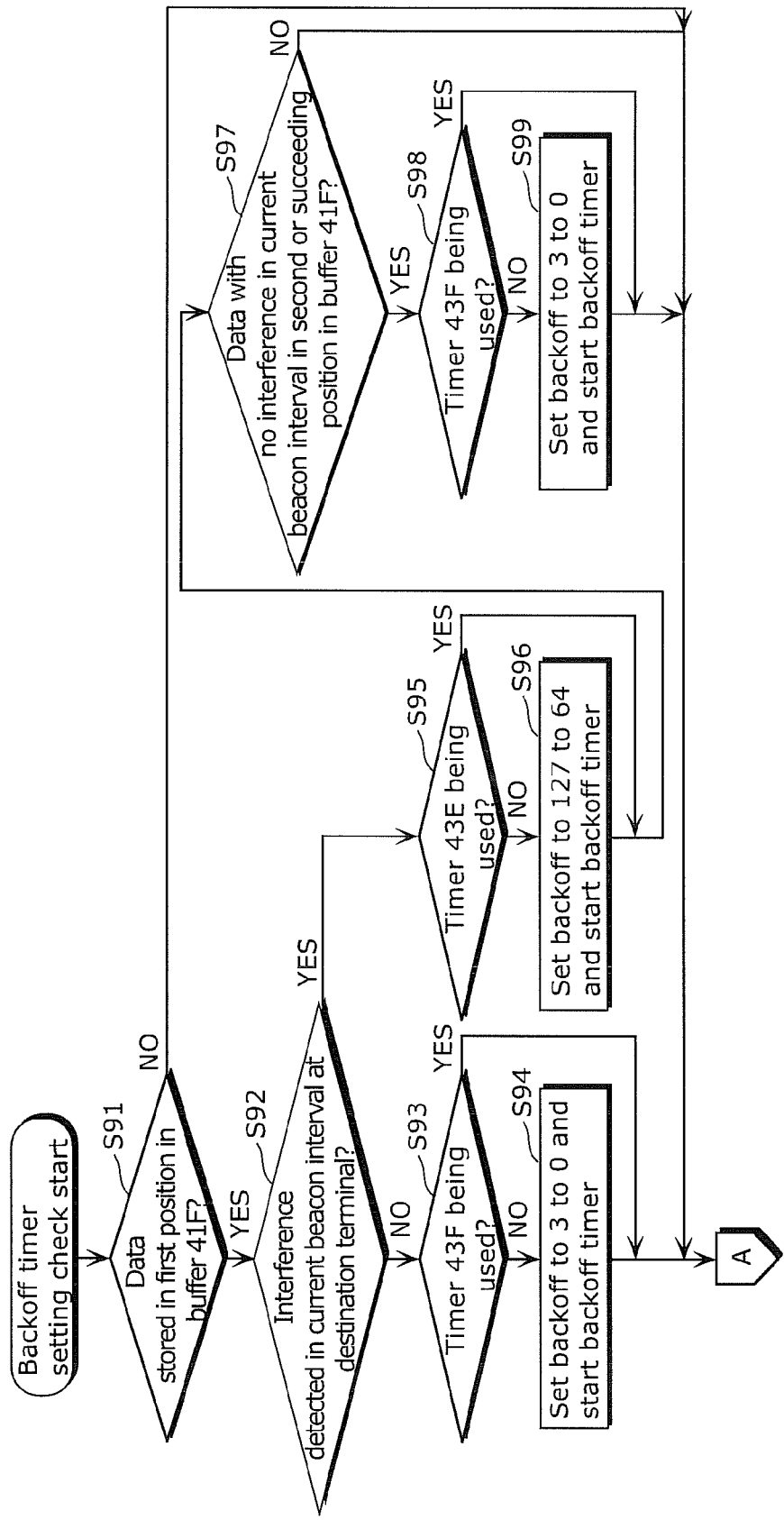
FIG. 42A is a diagram showing an example of a backoff timer setting check process flow of the control apparatus according to Embodiment 2 of the present invention.
Figure 42B:
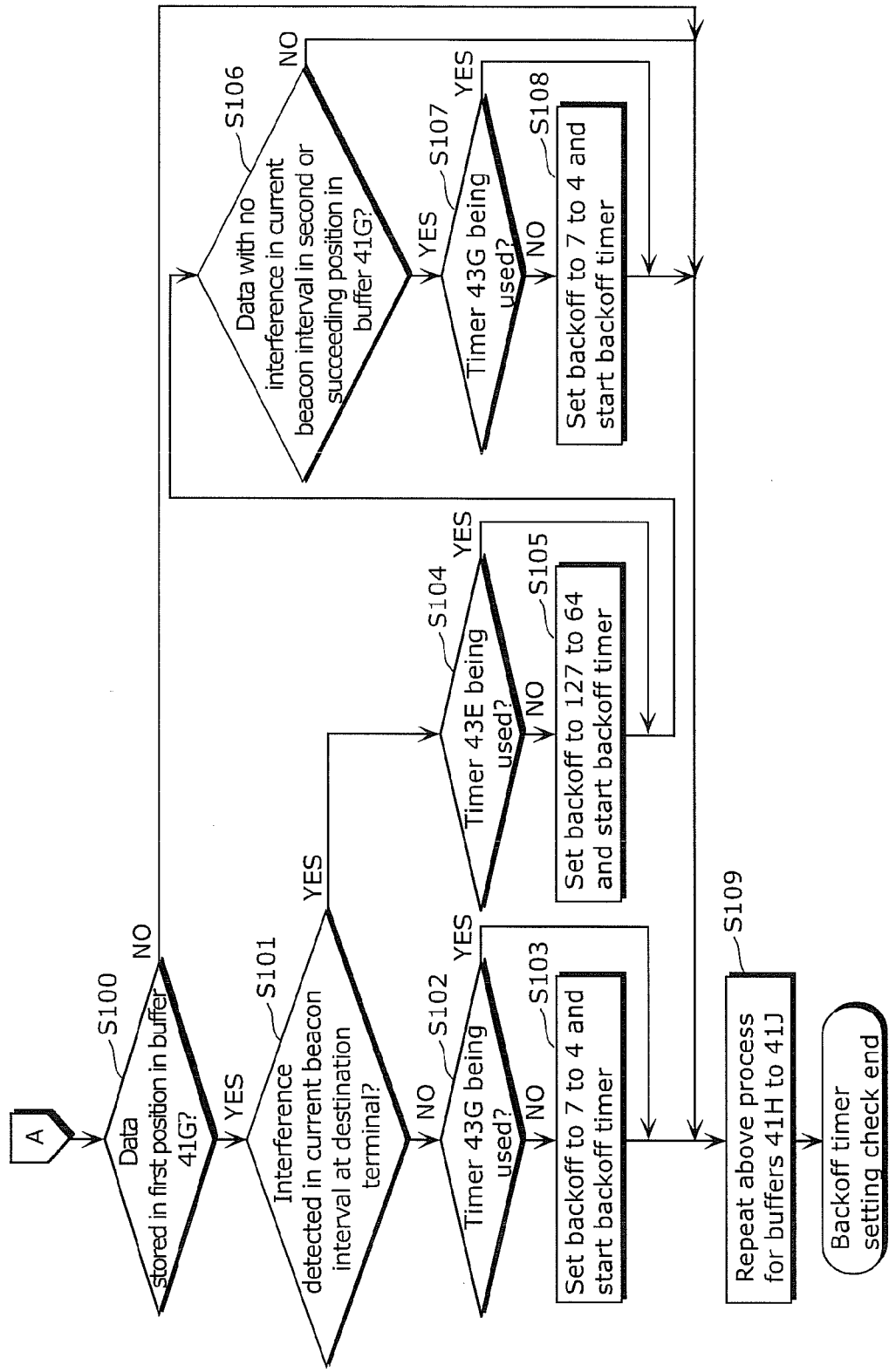
FIG. 42B is a diagram showing the example of the backoff timer setting check process flow of the control apparatus according to Embodiment 2 of the present invention.

FIGS. 42A and 42B show an example of a detailed process flow of the backoff timer setting check in Step S81 in FIG. 41.

The backoff control unit 43C in the control apparatus 40 checks whether or not transmission data is temporarily stored in the first (top) position in the buffer 41F in the transmission buffer 41A (Step S91).

In the case where no transmission data is stored, the backoff control unit 43C goes to a buffer 41G check process in Step S100 (Step S91: NO).

In the case where transmission data is stored in the first position in the buffer 41F (Step S91: YES), the backoff control unit 43C checks whether or not interference is detected in the current beacon interval at a destination terminal of the transmission data, with reference to the interference table in FIG. 37 managed by the interference management unit 43A. In the case where no interference is detected (Step S92: NO), the backoff control unit 43C recognizes that the backoff timer to be used is the timer 43F with reference to the backoff table in FIG. 38B managed by the interference frequency channel number and backoff management unit 43B, and checks whether or not the timer 43F is being used (Step S93).

In the case where the timer 43F is not being used, the backoff control unit 43C randomly sets the backoff value to 3 to 0 based on the backoff table, and starts the operation of the timer 43F with the set backoff value (Step S94).

In the case where the destination terminal of the transmission data stored in the first position in the buffer 41F detects interference in the current beacon interval (Step S92: YES), the backoff control unit 43C recognizes that the backoff timer to be used is the timer 43E, with reference to the backoff table in FIG. 38A managed by the interference frequency channel number and backoff management unit 43B. The backoff control unit 43C checks whether or not the timer 43E is being used (Step S95).

In the case where the timer 43E is not being used, the backoff control unit 43C randomly sets the backoff value to 127 to 64 based on the backoff table, and starts the operation of the timer 43E with the set backoff value (Step S96).

In the case where transmission data is stored in the second or succeeding position in the buffer 41F, the backoff control unit 43C checks whether or not there is transmission data to a terminal at which no interference is detected in the current beacon interval. The backoff control unit 43C performs this check by referencing to the interference table in FIG. 37 managed by the interference management unit 43A (Step S97).

In the case where, in the second or succeeding position in the buffer 41F, there is transmission data to a terminal at which no interference is detected in the current beacon interval (Step S97: YES), the backoff control unit 43C recognizes that the backoff timer to be used is the timer 43F, based on the backoff table in FIG. 38B managed by the interference frequency channel number and backoff management unit 43B. The backoff control unit 43C checks whether or not the timer 43F is being used (Step S98).

In the case where the timer 43F is not being used, the backoff control unit 43C randomly sets the backoff value to 3 to 0 based on the backoff table, and starts the operation of the timer 43F with the set backoff value (Step S99).

Next, in the case where transmission data is stored in the first position in the buffer 41G (Step S100: YES), the backoff control unit 43C checks whether or not a destination terminal of the transmission data detects interference in the current beacon interval, with reference to the interference table in FIG. 37 managed by the interference management unit 43A. In the case where no interference is detected (Step S101: NO), the backoff control unit 43C recognizes that the backoff timer to be used is the timer 43G with reference to the backoff table in FIG. 38B managed by the interference frequency channel number and backoff management unit 43B, and checks whether or not the timer 43G is being used (Step S102).

In the case where the timer 43G is not being used, the backoff control unit 43C randomly sets the backoff value to 7 to 4 based on the backoff table, and starts the operation of the timer 43G with the set backoff value (Step S103).

In the case where the destination terminal of the transmission data stored in the first position in the buffer 41G detects interference in the current beacon interval (Step S101: YES), the backoff control unit 43C recognizes that the backoff timer to be used is the timer 43E, with reference to the backoff table in FIG. 38A managed by the interference frequency channel number and backoff management unit 43B. The backoff control unit 43C checks whether or not the timer 43E is being used (Step S104).

In the case where the timer 43E is not being used, the backoff control unit 43C randomly sets the backoff value to 127 to 64 based on the backoff table, and starts the operation of the timer 43E with the set backoff value (Step S105).

In the case where transmission data is stored in the second or succeeding position in the buffer 41G, the backoff control unit 43C checks whether or not there is transmission data to a terminal at which no interference is detected in the current beacon interval. The backoff control unit 43C performs this check by referencing to the interference table in FIG. 37 managed by the interference management unit 43A (Step S106).

In the case where, in the second or succeeding position in the buffer 41G, there is transmission data to a terminal at which no interference is detected in the current beacon interval (Step S106: YES), the backoff control unit 43C recognizes that the backoff timer to be used is the timer 43G, based on the backoff table in FIG. 38B managed by the interference frequency channel number and backoff management unit 43B. The backoff control unit 43C checks whether or not the timer 43G is being used (Step S107).

In the case where the timer 43G is not being used, the backoff control unit 43C randomly sets the backoff value to 7 to 4 based on the backoff table, and starts the operation of the timer 43G with the set backoff value (Step S108).

Subsequently, the backoff control unit 43C performs the same procedure as the above-mentioned procedure performed for the buffer 41F or 41G, on the buffers 41H to 41J (Step S109), and ends the process.

Figure 43:
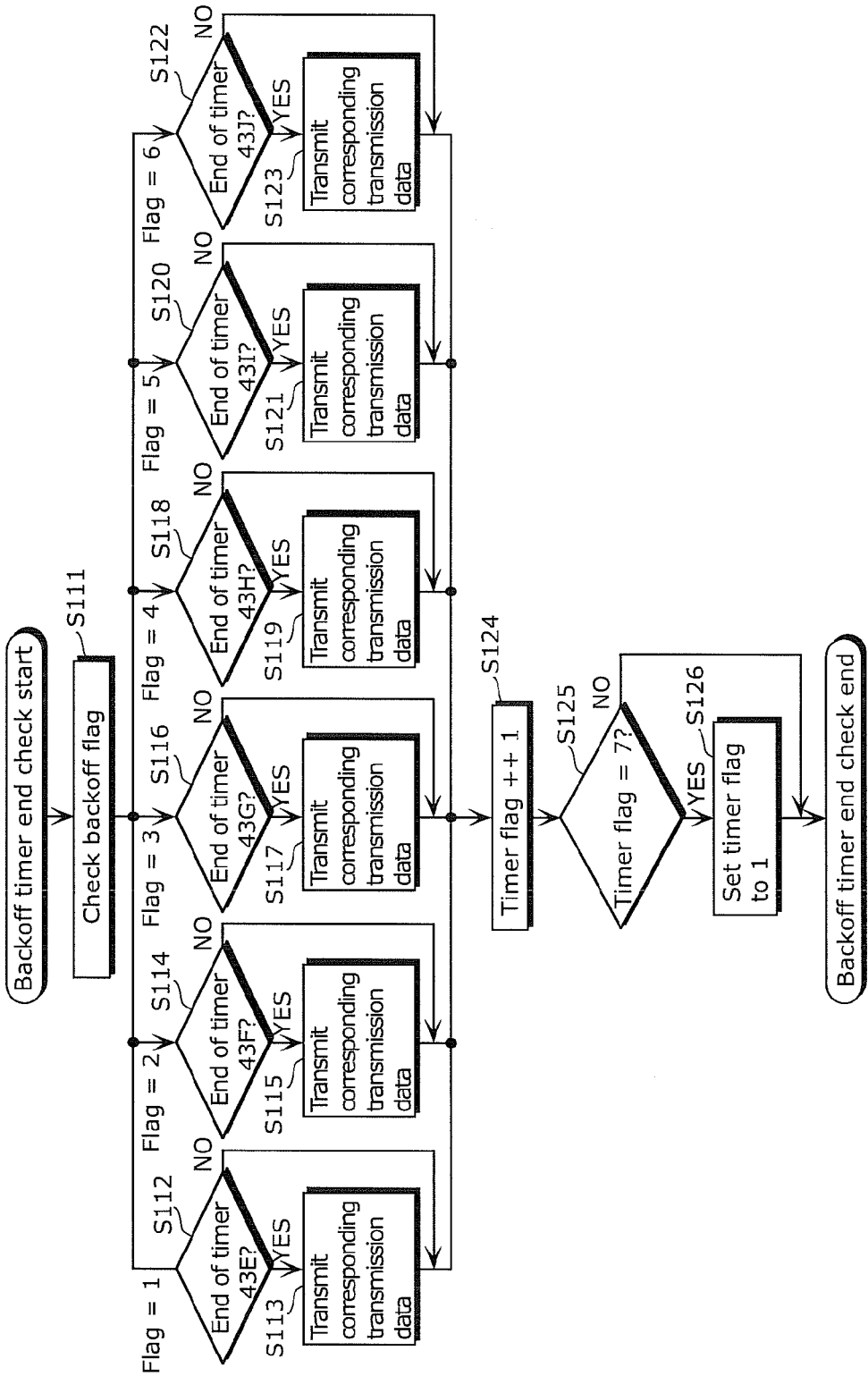
FIG. 43 is a diagram showing an example of a backoff timer end check process flow of the control apparatus according to Embodiment 2 of the present invention.

FIG. 43 shows an example of a detailed process flow of the backoff timer end check in Step S82 in FIG. 41.

First, the transmission buffer 41A in the wireless transmission and reception unit 41 checks a backoff flag (Step S111). The backoff flag is a flag stored in a memory or the like not shown by the transmission buffer 41A. The backoff flag is initially set to 1, and incremented by 1 each time the detailed process flow of the backoff timer end check is completed. When the backoff flag reaches 7, it is reset to 1.

In the case where the backoff flag is 1, the transmission buffer 41A checks whether or not the operation of the timer 43E ends (Step S112).

In the case where the operation of the timer 43E ends, the transmission buffer 41A passes the transmission data for which the timer 43E is started, to the frame processing unit 41B. The frame processing unit 41B adds a MAC header to the transmission data, and passes the transmission data to the modulation and demodulation unit 41C. The modulation and demodulation unit 41C modulates the transmission data, and transmits the transmission data to the destination terminal via the antenna (Step S113).

The transmission buffer 41A performs the same procedure to check the end of each of the timers 43F to 43J according to the backoff flag and, in the case where the operation of the timer ends, transmits the transmission data for which the timer is started, to the destination terminal (Steps S114 to S123).

The transmission buffer 41A then adds 1 to the backoff flag (Step S124). The transmission buffer 41A checks whether or not the backoff flag is 7 (Step S125). In the case where the backoff flag is 7, the transmission buffer 41A sets the backoff flag to 1 (Step S126), and ends the process.

As described above, in the backoff control of this embodiment, the control apparatus can set a different backoff value depending on the frequency channel, which produces an advantageous effect of preventing a decrease in communication efficiency of the entire system.

Moreover, by setting a larger maximum backoff value for transmission data to a terminal with a larger number of frequency channels on which no interference is detected, the opportunity of transmitting transmission data to a terminal with a smaller number of frequency channels on which no interference is detected can be increased.

Though this embodiment describes the case where the control apparatus 40 controls the backoff value for each frequency channel, the present invention is not limited to such. For example, the terminal 30 may include the control apparatus 40 and perform the same control as the control apparatus 40.

The present invention also includes an embodiment that combines this embodiment with Embodiment 1 or its variation(s). For instance, the backoff table in the interference frequency channel number and backoff management unit 43B may be held as relational expressions like the relational expressions in FIG. 24 which are an alternative to the backoff table in Embodiment 1. Furthermore, the backoff table in the interference frequency channel number and backoff management unit 43B may be combined with the structure of backoff table shown in any of FIGS. 21 to 23, 25, and 26.

Though each of the above embodiments describes the use of the wireless communication network, this is not a limit for the present invention, which is equally applicable to any other network using a plurality of frequency channels, such as PLC (Power Line Communications).

Though each of the above embodiments describes the case of performing backoff control of transmission data, the controlled object is not limited to this. For instance, backoff control of a control frame other than data may be performed. As an example, backoff control may be performed for all other packets, such as an inquiry frame used by an apparatus for inquiring of its communication partner about the presence or absence of data to be transmitted to the apparatus, and a RTS (Request to Send)/CTS (Clear to Send) frame for solving a hidden terminal problem.

Though each of the above embodiments describes the case of performing backoff control of transmission data for transmission data priority control, the priority control method is not limited to this. For example, the control apparatus may allocate bands in consideration of a state of each terminal.

Though each of the above embodiments describes the case where the backoff table indicating the same backoff values is stored in all terminals, the present invention is not limited to such. Each terminal may hold a different backoff table. Alternatively, the control apparatus may determine the backoff value for each terminal and notify the terminal of the backoff value so that the terminal exercises backoff control using the notified backoff value.

Though each of the above embodiments describes the case where the backoff value of transmission data as the priority is controlled according to the analysis result of the interference information analysis unit 42, the present invention is not limited to such. For example, a PHY rate of transmission data as the priority may be controlled according to the analysis result of the interference information analysis unit 42. FIGS. 44A and 44B show an example of a PHY rate table used for controlling the PHY rate according to the number of frequency channels on which no interference is detected.

FIG. 44A shows an example of a table indicating a relation between reception power and a standard PHY rate. The terminal or the control apparatus calculates reception power from a packet received from its communication partner, and determines a standard PHY rate by referencing to the table shown in FIG. 44A. The standard PHY rate is a PHY rate determined based on reception power of data received from a communication partner. When the PHY rate is lower, the time required for transmission of the same amount of data is longer. For example, transmission of data of 100 bytes requires 16 ms in the case where the PHY rate is 50 kbps, and requires 80 ms in the case where the PHY rate is 10 kbps.

In the case where the reception power is low, increasing the PHY rate of transmission data raises a possibility that an error occurs, and so the transmission needs to be performed at a low PHY rate. Hence, it is necessary to set a PHY rate suitable for a propagation state using the table in FIG. 44A in order to achieve efficient band use.

FIG. 44B shows an example of a PHY rate table indicating the PHY rate corresponding to the number of frequency channels with no interference.

The terminal or the control apparatus determines, using the table in FIG. 44B, a transmission PHY rate used for a packet to be transmitted, from the standard PHY rate determined based on the table in FIG. 44A and the number of frequency channels with no interference at the terminal (in the case of the control apparatus, the number of frequency channels with no interference at a terminal communicating with the control apparatus). The transmission PHY rate is a PHY rate used when transmitting data to the communication partner.

According to the PHY table in FIG. 44B, the transmission PHY rate is determined to be lower than the standard PHY rate when the number of frequency channels with no interference is smaller. Thus, when the number of frequency channels with no interference is smaller, the PHY rate at which data is transmitted is set to be lower than the standard PHY rate determined from the reception power which is a propagation state parameter. This increases immunity from errors, with it being possible to enhance reliability of transmission on the current frequency channel.

Figure 45:
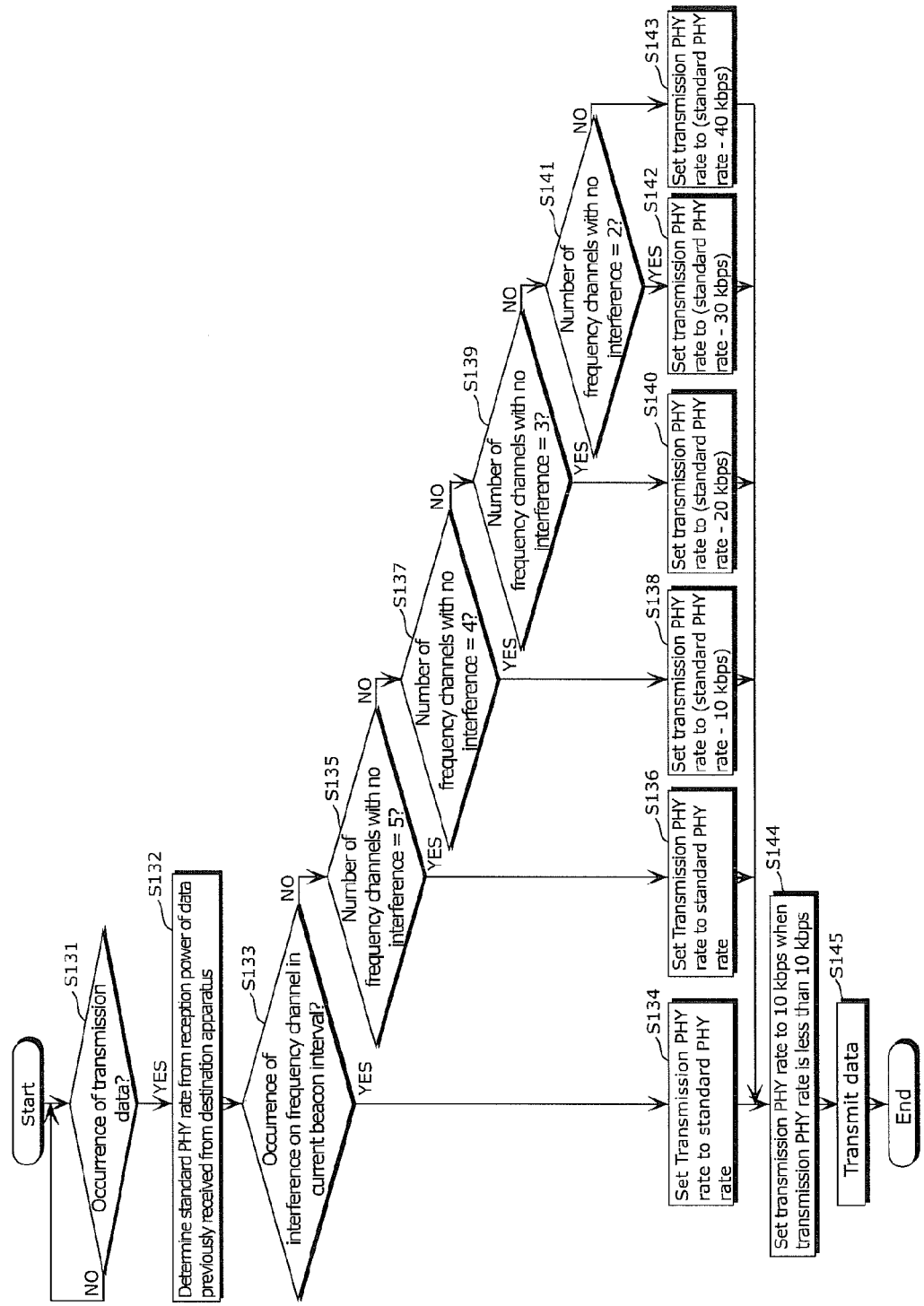
FIG. 45 is a diagram showing an example of a data transmission process flow of the terminal using the PHY rate table according to the present invention.

FIG. 45 shows an example of a data transmission process flow of the terminal 30.

When receiving transmission data from an upper layer not shown, the terminal 30 feeds the transmission data to the wireless transmission and reception unit 11 (Step S131: YES).

Upon detecting the data fed to the wireless transmission and reception unit 11, the frequency channel priority control unit 13 determines the standard PHY rate based on reception power of data previously received from the communication partner which is the destination of the transmission data (Step S132).

Moreover, upon detecting the data fed to the wireless transmission and reception unit 11, the frequency channel priority control unit 13 checks whether or not interference occurs on the frequency channel in the current beacon interval. Here, the check is performed using the interference determination result stored in the initial process (Step S133).

In the case of determining that interference occurs on the current frequency channel (Step S133: YES), the frequency channel priority control unit 13 sets the transmission PHY rate to the value of the standard PHY rate (Step S134).

In the case of determining that no interference occurs on the current frequency channel (Step S133: NO), the frequency channel priority control unit 13 checks the number of frequency channels with no interference, using the interference determination result stored in the initial process. It is assumed here that a total of five frequency channels, i.e. CH1 to CH5, are supported in this system.

In the case where the number of frequency channels with no interference is five (Step S135: YES), the frequency channel priority control unit 13 sets the transmission PHY rate to the value of the standard PHY rate (Step S136).

In the case where the number of frequency channels with no interference is four (Step S137: YES), the frequency channel priority control unit 13 sets the transmission PHY rate to the value ((the standard PHY rate)−10 kbps) (Step S138).

In the case where the number of frequency channels with no interference is three (Step S139: YES), the frequency channel priority control unit 13 sets the transmission PHY rate to the value ((the standard PHY rate)−20 kbps) (Step S140).

In the case where the number of frequency channels with no interference is two (Step S141: YES), the frequency channel priority control unit 13 sets the transmission PHY rate to the value ((the standard PHY rate)−30 kbps) (Step S142).

In the case where the number of frequency channels with no interference is one (Step S141: NO), the frequency channel priority control unit 13 sets the transmission PHY rate to the value ((the standard PHY rate)−40 kbps) (Step S143).

The frequency channel priority control unit 13 then checks whether or not the set transmission PHY rate is less than 10 kbps. In the case where the transmission PHY rate is less than 10 kbps, the frequency channel priority control unit 13 sets the transmission PHY rate to 10 kbps (Step S144).

When notified of the end of the transmission PHY rate setting by the frequency channel priority control unit 13, the wireless transmission and reception unit 11 transmits the transmission data (Step S145).

The terminal 30 determines the PHY rate of data to be transmitted, by the procedure described above.

For example, in the case where the terminal 10D in Embodiment 1 transmits data using frequency channel CH3, the frequency channel priority control unit 13 in the terminal 10D calculates reception power from a beacon frame received from the control apparatus 20. The frequency channel priority control unit 13 then determines the standard PHY rate corresponding to the calculated reception power, by referencing to the table shown in FIG. 44A. It is assumed here that the reception power of the beacon frame is 10 dBm, and so the standard PHY rate is 50 kbps. The terminal 10D determines the transmission PHY rate, from the standard PHY rate and the number of frequency channels with no interference in the terminal 10D. Since the number of frequency channels with no interference in the terminal 10D is one, the transmission PHY rate is set to 10 kbps. Accordingly, the terminal 10D modulates and transmits the transmission data at the PHY rate of 10 kbps.

Note that, in the case of transmitting data using a frequency channel having interference, the data may be transmitted at any of the standard PHY rate and the transmission PHY rate. Moreover, PHY rate control may be combined with backoff control.

Besides, the standard PHY rate may be determined from reception power of data other than previous data.

Figure 46:
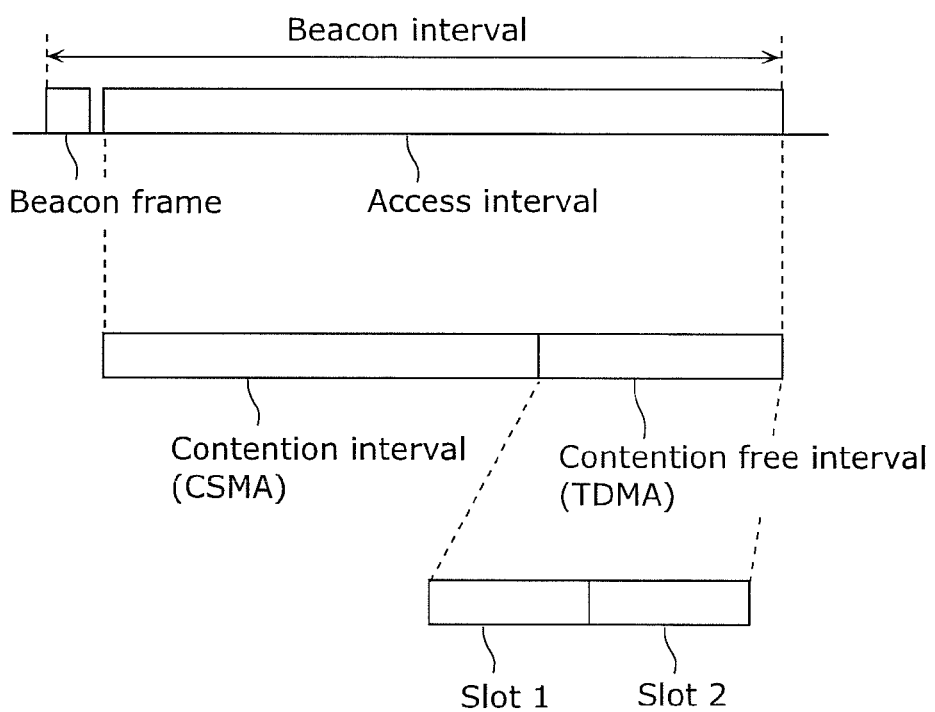
FIG. 46 is a diagram showing another example of the arrangement of the beacon interval according to the present invention.

Though each of the above embodiments describes the case where the backoff value of transmission data as the priority is controlled according to the number of frequency channels on which no interference is detected, the present invention is not limited to such. For example, an interval for performing wireless communication by TDMA (Time Division Multiple Access) may be provided in an access interval in each beacon interval, where the control apparatus allocates a TDMA interval to each terminal according to the number of frequency channels on which no interference is detected at the terminal. FIG. 46 shows an example of a beacon interval in which a TDMA interval is added.

The beacon interval includes an interval in which the control apparatus transmits a beacon including control information of the wireless network, and an access interval which follows. Each wireless terminal including the control apparatus is allowed to perform wireless communication in this access interval. The access interval is made up of a CSMA (Carrier Sense Multiple Access) interval in which each wireless terminal performs wireless communication by CSMA and a TDMA interval in which only a terminal designated by the control apparatus performs transmission.

Further, the TDMA interval is composed of slots 1 and 2. The control apparatus allocates each slot to a terminal according to the number of frequency channels on which no interference is detected at the terminal. This means that at most two terminals are each allowed to transmit data by TDMA in each beacon interval.

In this variation, the priority used when the wireless transmission and reception unit transmits or receives the signal indicates the opportunity of communicating by time division multiple access in the access interval in each beacon interval. Here, the frequency channel priority control unit sets the priority so that the opportunity of communicating by time division multiple access is greater when the number of frequency channels on which no interference is detected by the interference detection unit is smaller.

Figure 47:
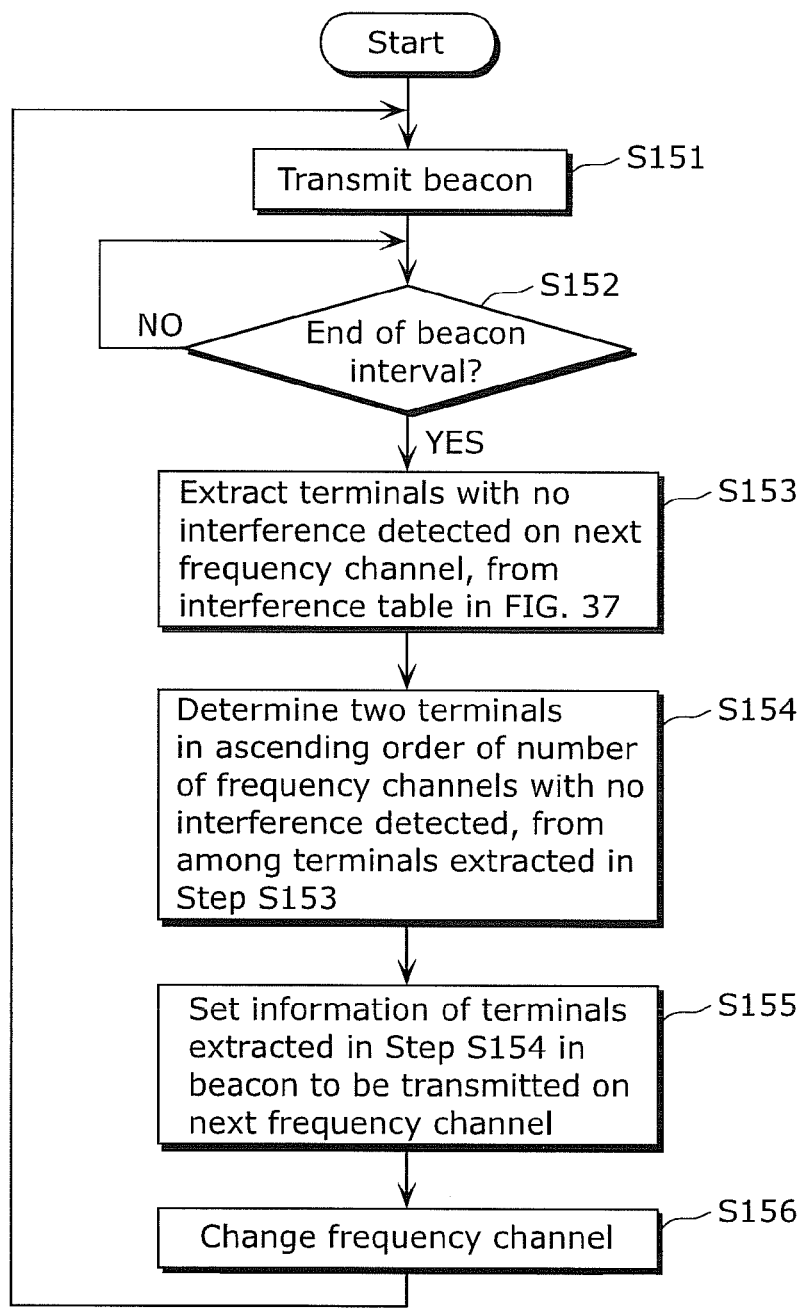
FIG. 47 is a diagram showing an example of a slot allocation determination process flow of the control apparatus according to the present invention.
Figure 48:
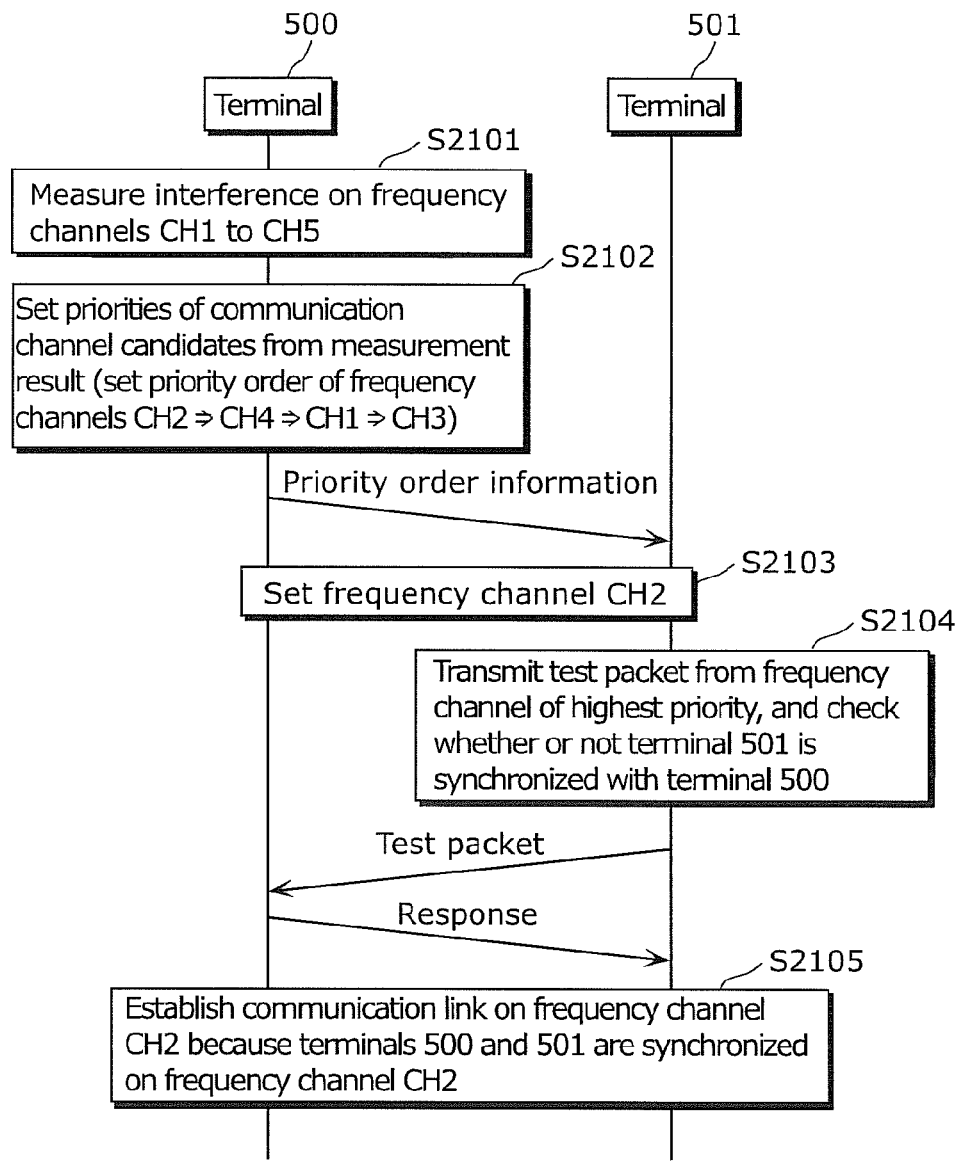
FIG. 48 is a diagram showing an example of frequency channel determination of a terminal in PTL 1.
Figure 49A:
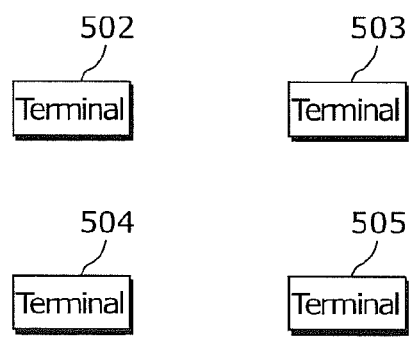
FIG. 49A is a diagram showing an example of frequency channel determination of a terminal in PTL 2.
Figure 50B:
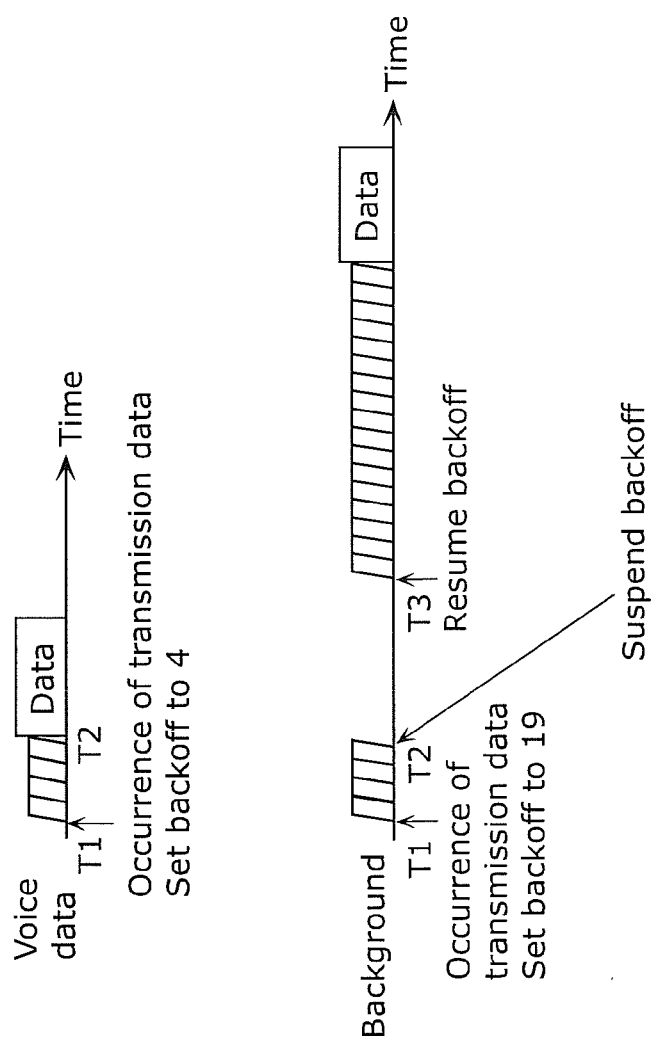
FIG. 50B is a diagram showing the example of backoff control of the terminal in NPL 1.

FIG. 47 shows an example of a data transmission process flow of the control apparatus 40.

After the initial process ends, the frequency channel determination unit 23 in the control apparatus 40 passes the determined frequency channel information to the wireless transmission and reception unit 41 and the beacon generation unit 24.

Upon receiving the frequency channel information from the frequency channel determination unit 23, the wireless transmission and reception unit 41 switches the frequency channel to frequency channel CH1 in the first beacon interval in the superframe interval.

After the wireless transmission and reception unit 41 switches the frequency channel, the beacon generation unit 24 generates a beacon frame including the frequency channel information received from the frequency channel determination unit 23 beforehand, and transmits the generated beacon frame to the wireless network via the wireless transmission and reception unit 41 (Step S151).

The wireless transmission and reception unit 41 performs data transmission or reception using frequency channel CH1, until the beacon interval ends (Step S152: NO).

When the beacon interval ends or by the time the beacon interval ends, the frequency channel priority control unit 43 extracts each terminal at which no interference is detected on the frequency channel in the next beacon interval (Step S153).

The frequency channel priority control unit 43 then determines two terminals in ascending order of the number of frequency channels on which no interference is detected, from among the extracted terminals at which no interference is detected on the frequency channel in the next beacon interval (Step S154).

The frequency channel priority control unit 43 allocates slots 1 and 2 to the determined terminals, and passes information of the allocation to the beacon generation unit 24.

Upon receiving, from the frequency channel priority control unit 43, the information of the terminals to which slots 1 and 2 are allocated, the beacon generation unit 24 sets the received information in a payload of a beacon frame (Step S155).

After the wireless transmission and reception unit 41 switches the frequency channel, the beacon generation unit 24 generates the beacon frame including the frequency channel information received from the frequency channel determination unit 23 beforehand, and transmits the generated beacon frame to the wireless network via the wireless transmission and reception unit 41 (Step S156).

As an example, in the case where the current frequency channel is CH3 in Embodiment 2, the control apparatus 40 determines two terminals in ascending order of the number of frequency channels on which no interference is detected, from among the terminals having no interference on frequency channel CH3 in the information of the interference table in FIG. 37. The control apparatus 40 allocates the slots to the determined two terminals. Since the number of frequency channels on which no interference is detected is one in the terminal 30D, three in the terminal 30B, and four in the terminal 30A, the control apparatus 40 allocates slot 1 to the terminal 30D and slot 2 to the terminal 30B. The control apparatus 40 transmits a beacon frame including information of the slot allocation.

Upon receiving the beacon, the terminals 30D and 30B each transmit data in the allocated slot. This suppresses a collision with another terminal, with it being possible to enhance reliability of transmission on the current frequency channel.

Here, only each terminal that has issued a slot reservation request to the control apparatus 40 in advance may be qualified for slot allocation. Besides, the number of slots is not limited to two. A necessary number of slots may be provided in each beacon interval, and also the number of slots may be changed from one beacon interval to another. In addition, a plurality of slots may be allocated to one terminal. Moreover, the control apparatus 40 may notify the allocation information using a packet other than a beacon frame. Furthermore, in the case where a terminal has interference on the current frequency channel, a slot may be or may not be allocated to the terminal with a higher priority.

Though each of the above embodiments describes the case where the beacon interval shown in FIG. 6 is composed of the interval for transmitting the beacon frame and the access interval, the present invention is not limited to such. For example, the access interval may end before the end of the beacon interval. In this case, information about the end time is set in the beacon frame.

Though each of the above embodiments describes the case where the beacon interval, the number of beacon intervals, and the channel use sequence are set in the payload of the beacon frame, the present invention is not limited to such. For example, these information may be transmitted using another packet after a predetermined time from the transmission of the beacon frame.

Though each of the above embodiments describes the case where the priority is determined according to the number of frequency channels with no interference, the present invention is not limited to such. For example, the priority may be determined in consideration of not only the number of frequency channels with no interference but also the presence or absence of interference on the frequency channel in the next beacon interval.

Though each of the above embodiments describes the case where the number of hops is only one for each frequency channel per superframe, the present invention is not limited to such. For example, a superframe structure having a hopping pattern of CH1→CH2→CH3→CH4→CH4→CH3 may be used. In this case, the backoff value may be determined according to the number of hops.

Though each of the above embodiments describes the case where the frequency channels are arranged in ascending order of channel number in the hopping pattern of each superframe, the present invention is not limited to such. For example, a hopping pattern such as CH1→CH4→CH2→CH5→CH3 is also applicable.

Though each of the above embodiments describes the case where the terminal or the control apparatus that suspends the backoff resumes the backoff after a predetermined time elapses from when another terminal completes data transmission, the present invention is not limited to such. For example, the backoff may be resumed immediately after the completion of the data transmission.

Each of the above apparatuses may actually be a computer system that includes a microprocessor, a ROM, a RAM, a hard disk drive, a display unit, a keyboard, a mouse, and the like. A computer program is stored in the RAM or the hard disk drive. Functions of each of the apparatuses can be achieved by the microprocessor operating in accordance with the computer program. The computer program mentioned here is a combination of a plurality of instruction codes that represent instructions to a computer for achieving predetermined functions.

The components in each of the above embodiments may be realized by LSI (Large Scale Integration) which is typically an integrated circuit. The components may each be individually implemented as one chip, or may be partly or wholly implemented on one chip. The integrated circuit may be called an IC, system LSI, super LSI, ultra LSI, or the like, depending on the degree of integration. Moreover, the integrated circuit method is not limited to LSI, and may be realized by a dedicated circuit or a general-purpose processor. A Field Programmable Gate Array (FPGA) or a reconfigurable processor capable of reconfiguring connections and settings of circuit cells in LSI may also be used.

Furthermore, when an integrated circuit technology that replaces the current semiconductor technology emerges from advancement of semiconductor technologies or other derivative technologies, such a technology can be used for the functional block integration. For instance, biotechnology may be adapted in this way.

The components that constitute each of the above apparatuses may be partly or wholly realized by an IC card or a single module that is removably connectable to the apparatus. The IC card or the module is a computer system that includes a microprocessor, a ROM, a RAM, and the like. The IC card or the module may include the above-mentioned ultra-multifunctional LSI. Functions of the IC card or the module can be achieved by the microprocessor operating in accordance with the computer program. The IC card or the module may be tamper resistant.

The present invention may also be the method described above. The present invention may also be a computer program that realizes the method by a computer. The present invention may also be a digital signal corresponding to the computer program.

The present invention may also be a computer-readable nonvolatile recording medium, such as a flexible disk, a hard disk, a CD-ROM, an MO, a DVD, a DVD-ROM, a DVD-RAM, a BD (Blu-ray Disc®), or a semiconductor memory, on which the computer program or the digital signal is recorded. Conversely, the present invention may be the digital signal recorded on such a recording medium.

The present invention may also be the computer program or the digital signal transmitted via an electric communication line, a wired or wireless communication line, a network such as the Internet, data broadcasting, and the like.

The present invention may also be a computer system that includes a microprocessor and a memory. In this case, the computer program may be stored in the memory, with the microprocessor operating in accordance with the computer program.

The computer program or the digital signal may be provided to another independent computer system by distributing the nonvolatile recording medium on which the computer program or the digital signal is recorded, or by transmitting the computer program or the digital signal via the network and the like. The independent computer system may then execute the computer program or the digital signal to function as the present invention.

The above embodiments and variations may be freely combined.

The embodiments disclosed herein are to be considered as in all aspects illustrative and not restrictive. The scope of the present invention is defined by the claims rather than by the description of the foregoing embodiments, and all modifications within the scope of the claims and within the meaning and scope of equivalence of the claims are intended to be included in the scope of the present invention.

INDUSTRIAL APPLICABILITY

The communication terminal according to the present invention is useful, for example, in a communication network system in which signal transmission and reception are performed using a frequency channel selected by switching between a plurality of frequency channels.

REFERENCE SIGNS LIST 10, 10A to 10D, 30, 500 to 513 Terminal
11, 14, 21, 41 Wireless transmission and reception unit
11A, 41A Transmission buffer
11B, 41B Frame processing unit
11C, 41C Modulation and demodulation unit
11D, 41D Frequency channel setting unit
11E Beacon analysis unit
12, 22 Interference detection unit
13, 43 Frequency channel priority control unit
13A, 43A Interference management unit
13B, 43B Interference frequency channel number and backoff management unit
13C, 43C Backoff control unit
13D, 43D Backoff timer
20, 40 Control apparatus 23 Frequency channel determination unit
24 Beacon generation unit
31 Interference information generation unit
41E Classification unit
41F to 41J Buffer
42 Interference information analysis unit
43E to 43J Timer
100 to 109, 130 to 134 Wireless communication interval
110 Wireless frame
111 PHY header
112 MAC header
113 Payload
114 ECC
116 Frame control
117 Destination wireless terminal address
118 Source wireless terminal address
120 Payload
121 Superframe interval
122 Beacon interval
123 Number of beacon intervals
124 Channel use sequence

The invention claimed is:

1. A communication terminal comprising:
a transmitter and receiver configured to transmit or receive a signal using a frequency channel selected by switching between a plurality of frequency channels;
an interference detector configured to determine, for each respective frequency channel of the plurality of frequency channels, whether or not interference occurs when transmitting or receiving the signal using the respective frequency channel; and
a timing setting unit configured to set a timing of when said transmitter and receiver transmits or receives the signal, the timing being set according to a number of frequency channels, of the plurality of frequency channels, for which no interference is detected by said interference detector,
wherein said transmitter and receiver is configured to transmit or receive the signal according to the set timing,
wherein the timing is determined by a maximum or minimum value of a backoff time,
wherein said timing setting unit is configured to set the timing so that the maximum or minimum value of the backoff time is larger when the number of frequency channels for which no interference is detected by said interference detector is larger, and
wherein the maximum or minimum value of the backoff time is larger in a case of transmitting or receiving the signal using a frequency channel for which the interference is detected by said interference detector, than in a case of transmitting or receiving the signal using a frequency channel for which no interference is detected by said interference detector.

2. The communication terminal according to claim 1, wherein a minimum value of the backoff time in a case of transmitting or receiving the signal using a frequency channel for which the interference is detected by said interference detector is larger than a maximum value of the backoff time in a case of transmitting or receiving the signal using a frequency channel for which no interference is detected by said interference detector.

3. The communication terminal according to claim 1, wherein said timing setting unit is configured to set the timing for each frequency channel of the plurality of frequency channels.

4. The communication terminal according to claim 1, wherein a minimum value of the backoff time in the case of transmitting or receiving the signal using the frequency channel for which the interference is detected by said interference detector is larger than a maximum value of the backoff time in the case of transmitting or receiving the signal using the frequency channel for which no interference is detected by said interference detector.

5. The communication terminal according to claim 1, wherein said timing setting unit is configured to set the timing of transmitting or receiving the signal so that the timing is different from a timing of when another communication terminal transmits or receives the signal.

6. A control apparatus comprising:
a transmitter and receiver configured to transmit or receive a signal using a frequency channel selected by switching between a plurality of frequency channels;
an interference information analyzer configured to, for each respective terminal in communication with said control apparatus, analyze information received from the respective terminal to determine, for each respective frequency channel of the plurality of frequency channels, whether or not interference occurs at the respective terminal when transmitting or receiving the signal using the respective frequency channel, the information indicating, for each respective frequency channel of the plurality of frequency channels, whether or not the interference occurs at the respective terminal when transmitting or receiving the signal using the respective frequency channel; and
a timing setting unit configured to set a timing of when said transmitter and receiver transmits or receives the signal, the timing being set according to a number of frequency channels, of the plurality of frequency channels, for which no interference is detected by said interference information analyzer,
wherein said transmitter and receiver is configured to transmit or receive the signal according to the set timing,
wherein the timing is determined by a maximum or minimum value of a backoff time,
wherein said timing setting unit is configured to set the timing so that the maximum or minimum value of the backoff time is larger when the number of frequency channels for which no interference is detected by said interference information analyzer is larger, and
wherein the maximum or minimum value of the backoff time is larger in a case of transmitting or receiving the signal using a frequency channel for which the interference is detected by said interference information analyzer, than in a case of transmitting or receiving the signal using a frequency channel for which no interference is detected by said interference information analyzer.

7. A communication method comprising:
transmitting or receiving a signal using a frequency channel selected by switching between a plurality of frequency channels;
determining, for each respective frequency channel of the plurality of frequency channels, whether or not interference occurs when transmitting or receiving the signal using the respective frequency channel; and
setting a timing of when to transmit or receive the signal in said transmitting or receiving, the timing being set according to a number of frequency channels, of the plurality of frequency channels, for which no interference is detected in said determining, wherein said transmitting or receiving includes transmitting or receiving the signal according to the set timing, wherein the timing is determined by a maximum or minimum value of a backoff time, wherein, in said setting of the timing, the timing is set so that the maximum or minimum value of the backoff time is larger when the number of frequency channels for which no interference is detected in said determining is larger, and wherein the maximum or minimum value of the backoff time is larger in a case of transmitting or receiving the signal using a frequency channel for which the interference is detected in said determining, than in a case of transmitting or receiving the signal using a frequency channel for which no interference is detected in said determining.

8. A communication method comprising:

transmitting or receiving a signal using a frequency channel selected by switching between a plurality of frequency channels;

analyzing, for each respective terminal in communication with a control apparatus, information received from the respective terminal to determine, for each respective frequency channel of the plurality of frequency channels, whether or not interference occurs at the respective terminal when transmitting or receiving the signal using the respective frequency channel, the information indicating, for each respective frequency channel of the plurality of frequency channels, whether or not the interference occurs at the respective terminal when transmitting or receiving the signal using the respective frequency channel; and setting a timing of when to transmit or receive the signal in said transmitting or receiving, the timing being set according to a number of frequency channels, of the plurality of frequency channels, for which no interference is detected in said analyzing, wherein said transmitting or receiving includes transmitting or receiving the signal according to the set timing, wherein the timing is determined by a maximum or minimum value of a backoff time, wherein, in said setting of the timing, the timing is set so that the maximum or minimum value of the backoff time is larger when the number of frequency channels for which no interference is detected in said analyzing is larger, and wherein the maximum or minimum value of the backoff time is larger in a case of transmitting or receiving the signal using a frequency channel for which the interference is detected in said analyzing, than in a case of transmitting or receiving the signal using a frequency channel for which no interference is detected in said analyzing.

9. A non-transitory computer-readable recording medium having a computer program recorded thereon for causing a computer to execute a method comprising:

transmitting or receiving a signal using a frequency channel selected by switching between a plurality of frequency channels;

determining, for each respective frequency channel of the plurality of frequency channels, whether or not interference occurs when transmitting or receiving the signal using the respective frequency channel; and setting a timing of when to transmit or receive the signal in said transmitting or receiving, the timing being set according to a number of frequency channels, of the plurality of frequency channels, for which no interference is detected in said determining, wherein said transmitting or receiving includes transmitting or receiving the signal according to the set timing, wherein the timing is determined by a maximum or minimum value of a backoff time, wherein, in said setting of the timing, the timing is set so that the maximum or minimum value of the backoff time is larger when the number of frequency channels for which no interference is detected in said determining is larger, and wherein the maximum or minimum value of the backoff time is larger in a case of transmitting or receiving the signal using a frequency channel for which the interference is detected in said determining, than in a case of transmitting or receiving the signal using a frequency channel for which no interference is detected in said determining.

10. An integrated circuit comprising:

a transmitter and receiver configured to transmit or receive a signal using a frequency channel selected by switching between a plurality of frequency channels;

an interference detector configured to determine, for each respective frequency channel of the plurality of frequency channels, whether or not interference occurs when transmitting or receiving the signal using the respective frequency channel; and a timing setting unit configured to set a timing of when said transmitter and receiver transmits or receives the signal, the timing being set according to a number of frequency channels, of the plurality of frequency channels, for which no interference is detected by said interference detector, wherein said transmitter and receiver is configured to transmit or receive the signal according to the set timing, wherein the timing is determined by a maximum or minimum value of a backoff time, wherein said timing setting unit is configured to set the timing so that the maximum or minimum value of the backoff time is larger when the number of frequency channels for which no interference is detected by said interference detector is larger, and wherein the maximum or minimum value of the backoff time is larger in a case of transmitting or receiving the signal using a frequency channel for which the interference is detected by said interference detector, than in a case of transmitting or receiving the signal using a frequency channel for which no interference is detected by said interference detector.

* * * * *

UNITED STATES PATENT AND TRADEMARK OFFICE
CERTIFICATE OF CORRECTION

| | | |
|---|---|---|
| PATENT NO. | : 8,724,477 B2 | Page 1 of 1 |
| APPLICATION NO. | : 13/388081 | |
| DATED | : May 13, 2014 | |
| INVENTOR(S) | : Hironori Nakae | |

It is certified that error appears in the above-identified patent and that said Letters Patent is hereby corrected as shown below:

On the Title Page, item (54), and in the Specification, Col. 1, lines 1-9, please change the title from "COMMUNICATION TERMINAL TRANMITTING OR RECEIVING A SIGNAL ACCORDING TO A SET TIMING DETERMINED BY A MAXIMUM OR MINIMUM VALUE OF A BACKOFF TIME AND CONTROL APPARATUS COMMUNICATION METHOD, COMPUTER PROGRAM AND INTEGRATED CIRCUIT PERFORMING THE SAME" to --COMMUNICATION TERMINAL TRANSMITTING OR RECEIVING A SIGNAL ACCORDING TO A SET TIMING DETERMINED BY A MAXIMUM OR MINIMUM VALUE OF A BACKOFF TIME, AND CONTROL APPARATUS, COMMUNICATION METHOD, COMPUTER PROGRAM AND INTEGRATED CIRCUIT PERFORMING THE SAME--.

Signed and Sealed this
Twenty-third Day of September, 2014

Michelle K. Lee
*Deputy Director of the United States Patent and Trademark Office*